United States Patent
Isaacson et al.

(10) Patent No.: US 9,373,138 B2
(45) Date of Patent: *Jun. 21, 2016

(54) SYSTEM AND METHOD FOR PROVIDING A SINGLE INPUT FIELD HAVING MULTIPLE PROCESSING POSSIBILITIES

(71) Applicant: Monticello Enterprises, LLC, Huntingtown, MD (US)

(72) Inventors: Thomas M. Isaacson, Huntingtown, MD (US); Ryan C. Durham, Dunkirk, MD (US)

(73) Assignee: Monticello Enterprises LLC, Huntingtown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,545

(22) Filed: Sep. 14, 2015

(65) Prior Publication Data

US 2016/0005095 A1    Jan. 7, 2016

Related U.S. Application Data

(63) Continuation of application No. 14/822,368, filed on Aug. 10, 2015, now Pat. No. 9,292,871, which is a continuation of application No. 14/672,876, filed on (Continued)

(51) Int. Cl.
*G06Q 30/06* (2012.01)
*G06F 17/30* (2006.01)

(Continued)

(52) U.S. Cl.
CPC .......... *G06Q 30/0613* (2013.01); *G06F 3/0482* (2013.01); *G06F 3/04842* (2013.01); *G06F 17/30554* (2013.01); *G06F 17/30864* (2013.01); *G06Q 30/0617* (2013.01);

(Continued)

(58) Field of Classification Search
CPC .............. G06Q 30/00; G06Q 30/0601; G06Q 30/0633; G06Q 30/0641
See application file for complete search history.

(56) References Cited

U.S. PATENT DOCUMENTS 8,660,912 B1    2/2014    Dandekar
2007/0106570 A1    5/2007    Hartman et al.
(Continued)

FOREIGN PATENT DOCUMENTS

WO    WO 2012/075304    6/2012

OTHER PUBLICATIONS www.travelocity.com, [online], Mar. 21, 2012 [retrieved from archive.org on Aug. 26, 2014].

(Continued)

*Primary Examiner* — Jeffrey A Smith
*Assistant Examiner* — Christopher Seibert

(57) ABSTRACT

Disclosed herein are methods for providing a buy option to search results in a generalized search engine. That one location for a search field can be a website, an application, a search bar in a web browser, etc. Rather than navigating to a website to perform a search in the context of that website, a user can instead navigate to or open a generalized search field. Via the generalized search field, the system can analyze the input from the user and the resulting context. A buy button can be included a search result to the user input in the input search field. Payment for an item can be processing using a payment account registered with the system with delivery coordinated with a separate merchant via an application programming interface.

18 Claims, 25 Drawing Sheets

Related U.S. Application Data

Mar. 30, 2015, which is a continuation-in-part of application No. 14/230,864, filed on Mar. 31, 2014.

(60) Provisional application No. 61/972,843, filed on Mar. 31, 2014, provisional application No. 61/972,834, filed on Mar. 31, 2014, provisional application No. 61/972,848, filed on Mar. 31, 2014, provisional application No. 61/972,865, filed on Mar. 31, 2014, provisional application No. 61/972,879, filed on Mar. 31, 2014, provisional application No. 61/972,861, filed on Mar. 31, 2014, provisional application No. 61/972,878, filed on Mar. 31, 2014, provisional application No. 61/972,892, filed on Mar. 31, 2014, provisional application No. 61/972,890, filed on Mar. 31, 2014, provisional application No. 61/973,287, filed on Apr. 1, 2014.

(51) Int. Cl.
*G06F 3/0482* (2013.01)
*G06F 3/0484* (2013.01)

(52) U.S. Cl.
CPC ....... *G06Q 30/0623* (2013.01); *G06Q 30/0625* (2013.01); *G06Q 30/0633* (2013.01); *G06Q 30/0635* (2013.01); *G06Q 30/0641* (2013.01)

(56) References Cited

U.S. PATENT DOCUMENTS

| | | |
|---|---|---|
| 2007/0294240 A1* | 12/2007 | Steele .............. G06F 17/30696 |
| 2008/0201304 A1 | 8/2008 | Sue |
| 2009/0037291 A1 | 2/2009 | Dawson et al. |
| 2009/0300476 A1 | 12/2009 | Vogel et al. |
| 2010/0114654 A1 | 5/2010 | Lukose et al. |
| 2012/0136756 A1 | 5/2012 | Jitkoff et al. |
| 2012/0233170 A1 | 9/2012 | Musgrove et al. |
| 2013/0013427 A1 | 1/2013 | Gonsalves et al. |

OTHER PUBLICATIONS www.tripadvisor.com, [online], Mar. 15, 2012 [retrieved from archive.org on Aug. 26, 2014].

Van den Poel, D. and W. Buckinx, "Predicting online-purchasing behavior," Jul. 28, 2004 [online]. European Journal of Operational Research 166 pp. 557-575. Retrieved from www.sciencedirect.com.

Van den Poel, D. and W. Buckinx. "Predicting online-purchasing behavior," Jul. 28, 2004 [online] European Journal of Operational Research 166 pp. 557-575. Retrieved from www.sciencedirect.com.

* cited by examiner

SYSTEM AND METHOD FOR PROVIDING A SINGLE INPUT FIELD HAVING MULTIPLE PROCESSING POSSIBILITIES

RELATED APPLICATIONS

This application is a continuation of U.S. Nonprovisional patent application Ser. No. 14/822,368, filed 10 Aug. 2015, which is a continuation of U.S. Nonprovisional patent application Ser. No. 14/672,876, filed 30 Mar. 2015, which is a continuation-in-part of U.S. Nonprovisional patent application Ser. No. 14/230,864, filed 31 Mar. 2014, and claims priority to U.S. Provisional Patent Application No. 61/972,843, filed 31 Mar. 2014, U.S. Provisional Patent Application No. 61/972,834, filed 31 Mar. 2014, U.S. Provisional Patent Application No. 61/972,848, filed 31 Mar. 2014, U.S. Provisional Patent Application No. 61/972,865, filed 31 Mar. 2014, U.S. Provisional Patent Application No. 61/972,879, filed 31 Mar. 2014, U.S. Provisional Patent Application No. 61/972,861, filed 31 Mar. 2014, U.S. Provisional Patent Application No. 61/972,878, filed 31 Mar. 2014, U.S. Provisional Patent Application No. 61/972,892, filed 31 Mar. 2014, U.S. Provisional Patent Application No. 61/972,890, filed 31 Mar. 2014, and U.S. Provisional Patent Application No. 61/973,287, filed 1 Apr. 2014, then entire contents of each of which are herein incorporated by reference in their entireties.

BACKGROUND

1. Technical Field

The present disclosure relates to an improved use of a generalized input field operated by an entity, such as on a website or other user interface. A user can enter input data for a search or with a purchase intent, which if a purchase intent is determined, the system provides a buy option. Upon interaction with the buy option, the system processes a payment from the entity and coordinates with a merchant to deliver the item through an application programming interface.

2. Introduction

The current use of input fields, such as the search field on Google™, is simple. The user inputs text related to a search and hits enter or clicks on the search button. Then Google processes the search and returns a list of results. Consider, however, if the user then desires to search Amazon® to purchase an item. The user then must enter the address www.Amazon.com into the URL field of the web browser and hit enter or click "go" or provide some similar input, at which point the web browser contacts Amazon, retrieves the page data, and presents the Amazon web page user interface with a separate search field. The user then enters a search term in that input field and hits enter or clicks on the search button. This is the typical approach where each website has an input field for use in searching under the umbrella of that particular website.

Thus, if a user transitions between doing a Google search, and then making a purchase on Amazon or on eBay, the user must navigate to multiple websites separately, and use multiple, separate input search fields to ultimately make a desired purchase or execute a desired search. The existing paradigm involves first going to a website and then inputting data into the search field of that website.

In some desktop versions of the Opera™ web browser, for example, a user can type into a search field an indicator of what type of search to do. For example, the user can set shortcut codes for various search engines so that a search of "g Olympics" will result in a Google search on the word "Olympics." Similarly, a search of "b Olympics" results in a Bing® search on the Olympics, while a search of "z Olympics" results in a search of Amazon.com™ on the Olympics. However, these require extra typing, and thus can take longer, and are also only limited to a single search source, and still require the user to navigate through the search results at the requested site. Thus, the user still must perform multiple additional steps to accomplish a desired goal.

Some versions of the Mozilla Firefox™ web browser provide a search field to the side of the URL field. The user can select from different search engines or websites for that search field, such as changing the field to search Google, Wikipedia, Yahoo, Bing, or Amazon. However, this is still cumbersome, as the user must change the field manually between different sites if the user desires to switch search sources.

SUMMARY

An example method is provided which addresses the concern above regarding the internet-centric problem in needing to navigate between search related sites and purchase related sites. An example method includes presenting an input field on a user interface of a first generalized search entity, wherein the input field is associated with processing data using a generalized search engine that indexes and searches both merchant sites and non-merchant sites. Google.com is an example of such a generalized search entity. The method includes receiving user input in the input field, determining, via a processor, that the user input is associated with one of a search intent and a purchase intent to yield a determination. When the determination indicates the search intent, then the system presents a search result comprising a non-merchant site and receives a search interaction associated with the non-merchant site. The system then transitions the user to the non-merchant site.

When the determination indicates the purchase intent, the system presents a purchase-related search result comprising a buy option associated with the user input and receives a purchase interaction associated with the buy option. The system then manages a purchase of an item associated with the purchase interaction based on or by using payment information stored at the generalized search entity. Delivery of the item can be handled via a merchant site separate from the generalized search entity. Managing the purchase can using the payment information stored at the generalized search entity can mean providing that payment information to the merchant site or processing a payment and notifying the merchant site to handle delivery. The coordination between the generalized search engine (or its application on a mobile device) and the separate merchant site (or merchant application on a mobile device) can be accomplished through an application programming interface which exchanges the necessary information to accomplish processing the purchase and delivering the item between the generalized search engine and the merchant.

The merchant sites and non-merchant sites can be websites or applications on mobile devices. The method can further include processing a payment for the purchase of the item from the generalized search entity to the merchant site. In this manner, the generalized search entity receives payment for an item and then pays the merchant. The generalized search entity and the merchant site can communicate via an application programming interface for managing the purchase and delivery of the item.

DETAILED DESCRIPTION

Figure 1:
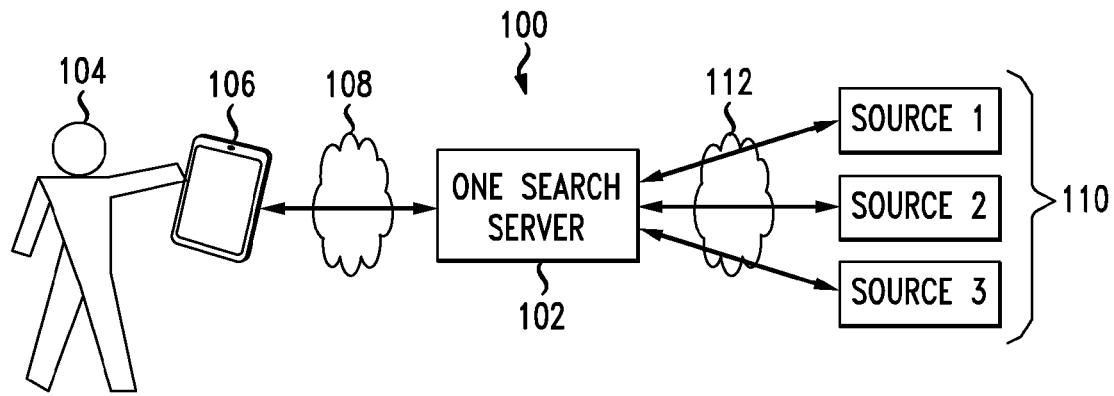
FIG. 1 illustrates a system architecture.

A system, method and computer-readable storage devices are disclose which unify access to multiple websites or other information sources such that the user only needs to visit one location, and utilize one input search field to achieve a number of different potential results such as doing a search or purchasing a product. That one location can be a website, a search bar in a web browser, an application on a desktop, laptop, smartphone, tablet, or other mobile device, etc. Rather than navigating to a website to perform a search in the context of that website, a user can instead navigate to or open a generalized search field. The search field can provide access to a search engine that crawls and indexes other websites at a large scale, such as the search engines provided by Google™, Yahoo™, or Bing™. In one embodiment, "at a large scale" can mean crawling and indexing at least 25,000 different domains. The search field can be applied to larger or smaller crawling domains. Thus, the generalized search engine can provide a primary function of serving results in response to search queries, while simultaneously provided a secondary function of identifying searches that may indicate a user's intent to make a purchase and providing quick and easy access for the user to act on that intent.

Via the generalized search field, the system can implicitly or explicitly process and analyze the input from the user and the resulting context. The system can also analyze based on a corpus of existing context for the user, such as recently viewed or opened web pages, recent actions the user has performed on the computing device, calendar information for the user, location data, recent purchases or other transactions, social networking data including posts, messages sent to friends, birthdays of friends, and so forth. The system can incorporate, as a data source, any information that can provide direct or indirect context for understanding or processing the input. For example, previous search history or purchasing history can provide direct context, while social media posts of friends of the user can provide indirect context.

Thus, the user goes to the website second, after the search is entered. This approach reduces the number of interactions, starting when the user opens a browser or application, to get to a webpage to make a purchase or a webpage of search results. In another aspect, drop down or drop "up" menus provide a much more rich opportunity for processing options such as one-click purchases or searching particular websites such as eBay® using the text input as search data. These drop down or drop "up" menus can be based on the location of the search input box, a search button, or some other element in the user interface. In yet another aspect, the generalized search field can still provide 'traditional' search results from one or multiple search sources, but can present, in addition to the traditional search results, one-click actions that the user can use, for example, to make a purchase directly from the listing of search results.

Various embodiments of the disclosure are described in detail below. While specific implementations are described, it should be understood that this is done for illustration purposes only. Other components and configurations may be used without parting from the spirit and scope of the disclosure. When specific method embodiment examples are discussed, the various steps of the method embodiments can be implemented in different orders, combinations, or permutations, including additional steps, or excluding specific steps.

The present disclosure overcomes the above-indicated deficiencies in current search implementations by providing a unified search field that enables a user to provide user input and achieve, in very few steps, one of a set of goals, such as completing a purchase, executing a search, executing a program, or interacting with an online service. The user can provide the user input as text, or in any other suitable form including multimodal input, gesture input, voice input, etc. When the disclosure refers to "input text" or "text" from the user, it is understood that the input can be provided as text or via some other input modality. The system can process the user input using traditional options such as a web search, but additionally, the system can process the user input to identify, present, and/or execute purchasing options or more focused searching options on other websites. The system can present these options in a tag cloud or drop down or drop up or drop sideways menus as the flexibility of the processing of the user input expands.

The basic concept according to a first embodiment is illustrated below. Assume that an example website www.one-search.com includes a user interface with an input field or search field. The input field can be a text input field, or can be a voice input field that utilizes speech recognition to populate the field with text from recognized speech, for example. The field is not just a search field but is a more generic input field from which multiple functions can be performed based on a determined intent of the input provided by the user. The search field is different from other search fields in how the www.one-search.com search field processes input. Usually, a person goes to the webpage, then searches, or chooses a search website, and then the search field is conditioned with a particular website context for searching. In this disclosure, the search context is open when the user enters data into the generalized input field. There is no presumption or setting that it will be a Google search, or an Amazon search. The resulting context will be dependent on an analysis of the input. The user interface can include a number of different search or processing buttons, each of which can expand the types of processing to perform on the input text. Different types of the buttons can include a Google search button, an Amazon search button, an Amazon one-click purchasing button, and an Apple.com purchasing button. The system can establish and provide the various button types in advance. Alternatively, a user can set up a collection of personalized buttons for tasks that the user desires or expects to perform with some regularity. The system can generate and present these buttons based on general search and activity trends of users, current promotions, advertisers paying for placement, and so forth. In place of or in addition to buttons, as the user types input into the field, the system can present "peeks" into various webpages which can be destinations for the users whether it is a search result, a purchase, an auction, or any other website destination. In this regard, rather than go to the website first, and then enter a search into a search field, this disclosure focuses on entering data in a general input field and then going to the website, or making the purchase, and different ways of processing that more improved input.

It is presumed, such as in the case of Amazon or an auction website, that when the user navigates to one-search.com, that user information, debit/credit card information, address information, etc., is stored in a user profile and available, as in the case of a registered user at Amazon.com. For example, as part of a registration or enrollment process, the user can establish an account with one-search.com, and authenticate or provide credentials to link the one-search.com account with accounts at other websites. So, as part of creating an account with one-search.com, the user can provide credentials for Google.com, Amazon.com, ebay.com, newegg.com, thinkgeek.com, and cheaperthandirt.com. Alternatively, the user can 'link' the accounts without providing credentials. For example, the user can authorize Amazon to share all or part of the user's information associated with his or her Amazon profile without providing the Amazon credentials to one-search.com.

Then, when the user performs searches at one-search.com, the system can use the existing linked accounts to generate one-click actions, or one-function (speech, gesture, multimodal input, etc.) actions. For example, one-search.com can perform a purchasing action when the user interacts with a presented buy option. The user can then manage linked accounts via a user portal or user management interface, to link additional accounts, update credentials, remove linked accounts, or manage which portions of the linked accounts are shared with one-search.com. Some websites may not require a linked account, but can still be incorporated into the one-search.com search field. This can be accomplished by processing a payment for an item associated with that merchant via the one-search.com registered account and enabling the merchant to handle the delivery. Some e-commerce sites allow purchases with a guest account, in which case a one-search.com action can include navigating to the e-commerce site, adding a desired item to the cart, providing sufficient information about the user, such as payment information, a delivery address, etc., to complete the purchase. In another example, some websites, such as a search engine, can be enhanced when linked to an account, but do not require a linked account. In these situations, the user can decide whether to link an existing account with the search engine for processing purchases, or whether to use the search engine without a linked account.

The one-search.com website can inspect and use browser cookies from other sites to glean user data, glean search history, or any other information stored in or made available via cookies. The system can, for example, use a session cookie to determine that a user has or had an active session with a particular website, and can use information in the session cookie to construct a URL for a one-click page to execute a purchase in response to user provided input. Alternatively, the system can use the live session to negotiate the website, add a desired item to a shopping cart, populate payment and shipping information on behalf of the user, and present to the user the final stage in the checkout process so the user can simply click once on a "submit order" button, or hit "enter" in the one-search.com unified input field to complete the purchase. In this way, the number of steps from search to purchase (or from search to performing some other action), is drastically reduced. While many of the examples provided herein discuss making a purchase, the principles disclosed herein can be applied to other, non-purchase transactions as well. For instance, in much the same way that the system can navigate to a website, populate a shopping cart with an item, and fill in shipping and payment information on behalf of the user, the system can also navigate to some other website for a result that requires a set of information to be provided. If the user enters the text "Why did my credit score just drop?" in the input field, the system can identify one of the major credit reporting bureaus, a third-party credit report aggregation service, or a free credit report site. The system can automatically provide the necessary information, on behalf of the user, to get to the credit score information, and present that page as a potential result or as an option in response to the user input. Many similar tasks on the World Wide Web require navigation from one page to the next to the next, and input in response to various questions. The one-search.com system can shorten or automate the input required from the user to navigate through these series of web pages to obtain a desired piece of information, a desired action, or a desired outcome.

Figure 2:
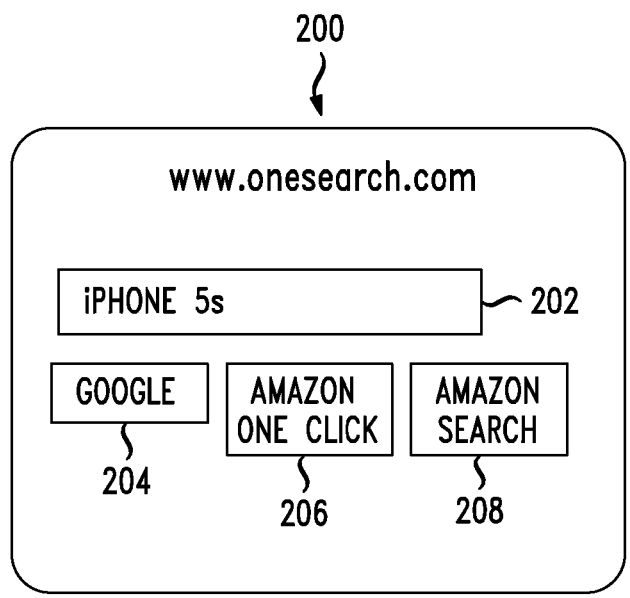
FIG. 2 illustrates an example search field.

FIG. 2 depicts an example search or input field. In this initial embodiment, the user enters a term in the input field of one-search.com, such as "iPhone 5S 32 GB silver." At this point, the user can click on any number of options for processing the input, such as a Google search 204, an Amazon.com one-click purchase button 206, or an Amazon.com search 208 button. In this example, the user clicks on the Amazon.com one-click purchasing button 206. Thus, from this field, the system receives that input, processes the input, and can execute a purchase, just as though the user had navigated through Amazon.com to an iPhone 5S, having 32 GB of storage, and a silver color, and had just clicked on the one-click purchase button. However, in this first embodiment, the user did not need to navigate to Amazon.com but rather was able to make a one-click purchase from a separate website, namely the one-search.com website. In one aspect, the user does not even need to click a particular button, and can instead simply hit "enter" as the user would to execute a normal search request. From that, the system can analyze the text input to determine if a probability of the user desiring to make a one-click purchase is above a certainty threshold, and the system can then process an "enter" input as a request to execute a purchase.

The system can process the input according to the button clicked, as though the user entered the text into an input directly at Amazon.com or Google.com and simply clicked search. If the user clicked a Google search 204, then the system would return search results from Google, but could similarly provide search results from Bing, Yahoo, or some other search engine. In one aspect, the system can transfer the user to Google.com, cause a search to be performed using the user's search input, and present the results as though the user had initially done the search at Google.com. In another aspect, the system can generate a URL at google.com as if the user had performed the search using the user's search input, and open that URL at google.com for the user. If the user selects a one-click purchase 206, then the system processes a purchase and delivery of the item through Amazon.com as though the user had navigated via Amazon.com to the item and made the purchase. In other words, the functionality of the "enter" button can be modified (dynamically, and several times) based on an analysis of the user input. Based on a variety of factors, the initial default might be a purchase context, but then the user starts to enter data and the context may change to a web search, and then finally when the user is done entering input, the "enter" button may cause processing associated with mapping, or back to a purchase context.

If the user selects an Amazon.com search 208, then the system returns a view of the search results on Amazon.com for that phrase. In other words, the user could be transferred to Amazon.com, logged into their account or joined into an existing session for the account, and presented with a screen which is the equivalent (or essentially or functionally equivalent) of the state as though the user had searched Amazon.com for "iPhone 5S 32 GB silver." From that state, the user could peruse the returned list of items and then perhaps choose an item, at which point the user could "one-click" purchase an iPhone.

Indeed, in one example, the system can redirect the user to Amazon.com (or navigate to Amazon.com on behalf of the user) in the same manner as if the user had started at Amazon.com and entered the search terms. In this case, the algorithm of one-search.com would receive the search input, receive the desired instruction from the user (by clicking on the Amazon.com search button) and transition the user to Amazon.com. User registration information or web browsing state information stored in a cookie or elsewhere or sent via XML can also be read or transferred such that the user is logged into their Amazon.com account in the transition. Data can be stored with one-search.com or with a browser or app. The result of this process is that when the user opens a browser to start browsing the Internet, the system enables the user to initiate any number of searches, purchases, or other actions via a single, unified input field that requires fewer clicks or user input to get to search results, or to make a purchase.

Another embodiment simplifies the process even further. Typically, as described above, a website such as Google or Amazon has a single-purpose entry so that the user can click "enter" and the received meaning of that is to process the text in the input field as a Google web search or as an Amazon product search. In this second embodiment, the search field has multiple possible ways of processing the text in the input field. An algorithm analyzes and processes the input to determine or predict the meaning or user intent of the text input. Via such an analysis, the system determines what type of search or action the user wants. Thus, if the user types "Olympics" into a search field at one-search.com, the system can determine via the algorithm that user is unlikely to want to search Amazon.com or eBay for "Olympics" because the Olympics is not something available for purchase. However, if the user enters additional information, such as "Olympics windbreaker Sochi 2014," the system can revise the determination of intent, because the additional information input by the user is now directed to a specific item or category. Thus, the system can continuously evaluate or determine intent of the user based on the text or data provided. The system can reevaluate intent as each character or word is input, for example. The system can anticipate intent and cache or preload results or actions for a number of anticipated intent scenarios based on context information for the user and the data provided so far. Thus, if the anticipated intent (i.e., Google search versus an Amazon purchase versus an Amazon search) turns out to be correct, the system already has the components in place or the pages fetched to service that intent.

The system may utilize any type of data such as user profile data, social media data, historical data, time of year (holidays are coming, summer time, a friend or family member has a birthday in one week, etc.), to make this determination. In this example, the system may determine when the user clicks on "enter" that the user intended a Google search for that input. For example, if the user types "Paul Revere American revolution," the system can detect that the semantic content and the structure of the text is more closely aligned with an informational search instead of a product search, and can route the search text through a search engine. In that case, the primary results as though the user had entered a Google search are presented. The one-search.com results screen could also provide alternates in case the user actually desired a Bing search or did want an Amazon.com search. If the user enters that information into a search field at one-search.com, the system can cause the browser to navigate to google.com, upon the user pressing enter, as if the user had searched at Google originally for the search string. Alternatively, the system can load the corresponding Google search page in an iframe or other embedded mechanism in a webpage, or as a new tab or window. The system can utilize any of a number of various transitions to present the Google search page to the user, even though the user initiated the search at the one-search.com page.

On the other hand, if the user enters "Revere tea kettle," the system can analyze the input text to determine that the user likely desires to make a purchase. Thus, when the user hits "enter," the system can route the search to Amazon or another suitable e-commerce site, or can immediately execute a one-click purchase from Amazon based on the search. Upon determining that the user intent is a purchase, the system can perform an analysis of or rely on a previously performed analysis of the user's purchasing habits or other purchase related information such as lowest price, lowest price plus shipping, availability, shipping time or method, user membership in a shopping club, whether the user has an account with an online merchant, and so forth. Based on this analysis, the system can determine which retailers are above an intent threshold, and provide the user with ways to easily access those retailers. The system can sort the retailers in an order of likelihood to be what the user desires, and can restrict the list of retailers presented to the user. For example, the list can be restricted based on a price spread, available screen space to present options to the user, or other factors.

In an example of these principles, the user enters the text "large supreme pizza" into the one-search.com input field. The system can analyze the user's browser history, previous queries at one-search.com, user accounts at various pizza delivery places, a location of the user and nearby pizza delivery places, credit card transaction data of pizza purchases, and so forth. Based on this information, one-search.com can, before the user presses enter and/or mid-query, determine that Dominos, Papa Johns, and Pizza Hut are nearby, are open, and that the user has made purchases with them in the past 6 months. Then, the system can present a preview of each of these merchants so that the user can simply click once to place an order for a large supreme pizza. The one-search.com system can display the logo of each pizza merchant, with a summary of the order that would be placed and the associated cost if the user clicks on the logo. For example, the system can display, below the Dominos logo, "16" large supreme pizza, $16.24, delivered to 123 Fake Street, Springfield, Ohio. Delivery by 6:15 pm." Then, the user can click on the Dominos logo to place the order, or the user can interact with the one-search.com page or Dominos webpage directly to modify various aspects of the order before placing the order. The one-search.com system can dynamically update the previews as the user types additional information in the search field. The one-search.com system can further provide an indication of a 'default' action that will be executed if the user presses "enter" on the keyboard. In this way, when the user is satisfied with the default result, or only one result remains after the user inputs the text, the user can simply press "enter" and the system can execute the action, such as placing an order for pizza.

In another example, the user enters the term "iPhone 5S 32 GB silver" into one-search.com. The system can analyze the text, to determine that this search is clearly directed to a product based on the specific amount of detail to identify one or a few items that could be purchased. Further, if the search is executed on December $8^{th}$, then the system can be especially tuned to be more sensitive to recognize purchase requests due to the gift giving atmosphere surrounding Christmas or other holidays. The algorithm can analyze previous searches for various iPhones to determine which, based on running the algorithm, would result in a threshold value being passed that there is a high likelihood that the user desires to purchase this product rather than just search for it. When the user hits "enter," the system processes that input as though the user was viewing the iPhone 5S 32 GB silver on Amazon.com with the option to make a "one-click" purchase. Here, by entering that data into the one-search.com field, and clicking "enter", the system can, on behalf of the user, implement the steps at Amazon.com as if the user had completed a purchase of the item. The system can perform these actions via HTTP requests, as if the user had navigated to the website and entered the information herself, or the system can communicate with the various web services via their established APIs. The system can notify the user that the order has been placed, and provide any shipping or order details to the user.

Alternatively, the system can transition the user directly to an Amazon.com environment or present a user interface notifying them that the purchase is being processed by a website that processes via user profile data a purchase and delivery of the product as can be done at Amazon.com or by Apple.com, etc.

In one embodiment, the user can confirm the order before the system places the order on behalf of the user. In another embodiment, the system places the order automatically for the user, and the user can choose to accept the order by doing nothing or choose to reject or modify the order by providing some input, such as clicking a button or opening an order page in a new tab or new window. In one example, the system may have placed an order for a silver iPhone 5S, but the user changes his or her mind and wants to order a gold iPhone 5S. The user can modify the order directly at one-search.com, or one-search.com can redirect the user to Amazon.com to modify the order. Sellers can compete for the business of processing this input, and the system could report on who bid for the lowest price. The system can provide the user with an 'out' by cancelling the purchase within a certain amount of time. In a similar manner, the system can detect that a user has just placed an order for an iPhone 5S, and implement a 'cool-down' period, during which the system will not automatically order an additional iPhone on behalf of the user without some additional or explicit approval from the user.

The system can cap or confirm orders that appear to be erroneous or unintentional. For example, if a new user does not realize how the system works, he or she may search for an iPhone 5S 32 GB silver multiple times, and inadvertently order multiple telephones. The system can have a built-in mechanism to detect such potentially unintentional purchase patterns, and incorporate some heightened level of user approval or confirmation before proceeding to make purchases on behalf of the user when such patterns are detected. The user can establish security measures or purchase limits on the account, so that a child or unauthorized person is unable to make purchases above a specific spending limit, or so that purchases above a threshold require authentication via email or text message or some other mechanism. If the system detects an unauthorized purchase, the system can temporarily stop or prevent purchase transactions altogether for the entire one-search.com account, or for specific log-in locations.

Using the "enter" button and processing the input based on a predicted intent can result in ambiguities. When a user searches via Amazon.com for a product, the user navigates to the right model with the desired size, color, carrier, and so forth. Then when the user makes an Amazon.com one-click purchase, the user knows all of the data about the product before making the purchase. In the model disclosed herein, the system can also deal with product ambiguity. Assume the user enters "iPhone 5S 32 GB" at one-search.com, and that the available colors are black, silver, and gold. The algorithm determines, based on the input text, that the user likely desires to make a purchase and processes the input text accordingly. The system can select the most popular color and fill in that unknown parameter accordingly. The system can select not only the most popular model based on popular size and color, but the system can incorporate demographics data to determine the most popular model for people similar to the user. For example, if the user enters "iPhone 5," the system can select a yellow 16 GB iPhone 5C for a teenage girl, or a black 64 GB iPhone 5S for her father. The system can further analyze past purchases of similar or related devices to determine likely user preferences for this purchase. If the user is already registered, and via the browser, application or website, the system knows who is doing the search, then user preferences, history, classification model based on previous searches across multiple websites, etc. can be applied to analyze the one-search input field. If the user has made electronics purchases in the past that are all silver, the system can assume that the user is likely to want a silver iPhone 5S, and populate the cart accordingly. Similarly, if the user has consistently purchased the largest storage capacity model in previous purchases of mobile devices, the system can automatically populate the cart with the iPhone 5S with the largest storage.

Returning to the above example, the user clicks "enter" and the system presents a user interface screen that states "You have purchased the black iPhone 5S 32 GB—if you want silver instead, hit enter." In other words, the system can choose the most popular color, and present an option to change a parameter such as the color via hitting "enter" again. This second hitting of "enter" cancels the previous order of the black iPhone and replaces it with a silver one, or the system can simply update the purchase request. At that point of time in the process, it is as though the user had been viewing a silver iPhone, with the right features, and hit the one-click purchase button such that no other action needs to be taken to have it charged and delivered. The system can integrate with the merchant via an API to place a hold on a particular item, such as the black iPhone 5S 32 GB, while waiting for a period of time to allow the user to modify the order before committing or completing the purchase.

The process can be repeated as well. The system can present to the user "You have now purchased the silver iPhone 5S 32 GB—if you want the gold one, hit enter." Hitting enter this time will cancel the order of the silver iPhone, and replace it with the gold iPhone. If the user does nothing else at this stage, the system commits the order for the gold iPhone, and the merchant will execute the order so the user will receive the gold iPhone, and the merchant will charge the user for the order in the normal fashion. Of course, button clicks can be provided for the user to change the various parameters and change the order. The interface can say "you have purchased the iPhone 5S 32 GB black—to change any of these parameters click here." The system can present various options to change the storage size, model, carrier, color, shipping options, etc. However, if the user does nothing, the system arranges for and places the order with the merchant on behalf of the user using the predicted parameters. As can be appreciated, the process enables the user from the time a browser or an application is opened up, to successfully make a purchase of the desired product in less interactions or fewer steps than was previously required.

In another embodiment, the system can include an autocorrect or autocomplete feature with one-click purchasing ability in the context of a single search or at Amazon.com, one-search.com, or any other website where a purchaser has registered data such as credit card, address, etc. A website search field can include an "autocomplete" where when the user types in a search term the autocomplete feature can either automatically complete the concept that user may desire, or present a list of suggested or recommended options based on the text input up to that point. The user can review the various autocomplete options and select one, thus alleviating the need to continue typing out the rest of the query. In this embodiment, the system receives a partial user input (or full input) via an input field, and, when analyzing the input for producing autocomplete options, the system can include a "one-click" purchasing option in the listing of autocomplete options. In other words, if the user enters the text "iPhone" as the partial user input, at that stage the system can identify and present "iPhone 5S 16 GB <one-click purchase>" as one of the "autocomplete" options. In that case, this modified listing of the autocomplete features reduces the number of clicks and the amount of text from the user in order to purchase the item. In other words, drop down or drop up features are not limited to the concept of seeking a standard autocomplete feature but rather blends autocomplete with purchasing options or other options such as jumps to other websites. Normally, the user would choose one of the autocomplete options, which would take the user to either an item or a listing of items, then the user has to click again to narrow down to one particular item, and then at that point the user is in position to "one-click" purchase the item. However, if the user clicks on the "one-click purchase" variation in the autocomplete listing, the system can place the order immediately.

The system can present various one-click options via the input field listing. For example, if, at the stage of typing "iPhone" the most popular iPhone is the 5S, with 32 GB and a silver color, the system can place that option, with a one-click purchase option, high or first on the list of autocomplete options for purchase. The next most popular model might be the 16 GB iPhone in black, which the system can display next in the autocomplete listing. Competitors can also provide offers in the autocomplete listing for a one-click purchase. A competitor can purchase the right to present an autocomplete one-click purchase option that is related, but does not include the searched-for text. For example, when a user is searching for "iPhone," the system can present an autocomplete entry to one-click purchase a "Samsung Galaxy S4." The system can further present promotional material in these autocomplete listings. However, because space is limited, the promotional material may be limited. One example of such a promotion is an autocomplete listing advertising "Samsung Galaxy S4—20% off <one-click purchase>" at Amazon.com. Companies can purchase advertising space under the autocomplete listing, or can pay a premium to elevate their products in autocomplete listings for a specific keyword, specific product, brand, and so forth. However, the system can also use business intelligence or feedback from various merchants to include, in the autocomplete options, results based on what people searching for item X eventually end up purchasing, even if the autocomplete option does not include the searched-for text.

Similarly, the system can track users' behavior, and can price certain users' attention at a premium for advertisers. For example, if the user has been researching smartphones daily for several weeks, advertisers of flagship smartphones may pay a higher price premium to target an interested, engaged buyer with advertising in the form of autocomplete options.

The system can provide a "one-click" purchasing option right in a drop down list of autocomplete options. Additionally, the autocomplete can include a listing that, if selected by the user, places the user in the context of one step prior to a one-click purchase at the merchant site. In other words, if a user enters "iPhone 5S" on a website like Amazon.com, Amazon.com presents to the user a number of listings of items. The user has to click on one of those items to narrow the results down to a single item, at which point the counting of clicks begins in the context of a "one-click" purchase. While viewing that single item, the user is then presented with a "one-click" purchasing option. Such a context, including the user's successful login with Amazon.com, would be characterized as a "pre-one-click" web page where the user has navigated to a point where the item is identified and the context is such that the user can make a one-click purchase. The problem is that getting to the pre-one-click page takes too many clicks and interactions.

Thus, the autocomplete listing can provide a simple way for the user to jump immediately to the "pre-one-click" stage in the merchant's web site. The autocomplete listing can not only include a "one-click" purchasing option at that stage, but could also include an option to take the user to a "pre-one-click" purchasing page, at which point, typically, there is more information about the item, a larger picture, reviews, a rating, product details, and so forth, such that the user can make a more informed purchasing decision. For well-known products, the user can make a one-click decision to purchase directly from an autocomplete listing, but for other products, the user may want to verify that the product is suitable for an intended purpose or compatible with some other user needs. The previous result of clicking on an autocomplete option is to process that option as though it was a search entered into the input field. However, that returns a listing of search results and not a "pre-one-click" page with one item ready to purchase. Accordingly, this alternate feature reduces the number of interactions necessary to get to a pre-one-click purchase page.

The purchasing autocomplete type options could be presented on a drop "up" listing and the searching or traditional autocomplete options could be presented on a traditional drop "down" menu. In other words, the directionality of the listing can be indicative of the functionality of the items listed. The directionality can be side to side, or in some other direction or angle. For example, the various one-click purchase and pre-one-click autocomplete listings can all be drop "down" menus, but at opposing 45 degree angles. The system can also present options in a tag field or tag cloud arrangement, where most likely options are presented closest to the input field (where they would be the quickest and easiest to access from a mouse perspective) and with the largest icon, text, graphic or other visual cues for selection.

Figure 3:
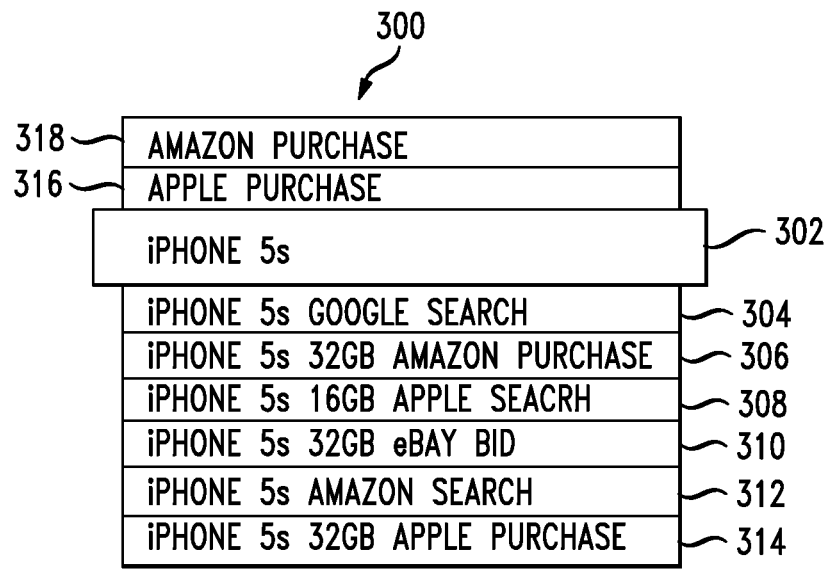
FIG. 3 illustrates a drop down and drop up menu according to an aspect of this disclosure.

FIG. 3 illustrates an example one search field and drop down menu feature 300. In this example, the single field 302 enables the user to provide input that the system analyzes to identify other options besides a search that are available. In this example, the user inputs "iPhone 5S" in the field 302. The algorithm analyzes that input to recognize that the search is directed to a product. The system can access a database of current products, purchasing patterns, product popularity, purchasing history of the user or of other users, and so forth. The system can access the database via an API call to one or more merchant databases. The algorithm can use this data to make a more accurate determination of whether the user desires a search or a specific product to purchase. In this case, the input "iPhone 5S" is clearly a product, thus this knowledge will help to drive and control the construction of the drop down menu options.

Figure 4A:
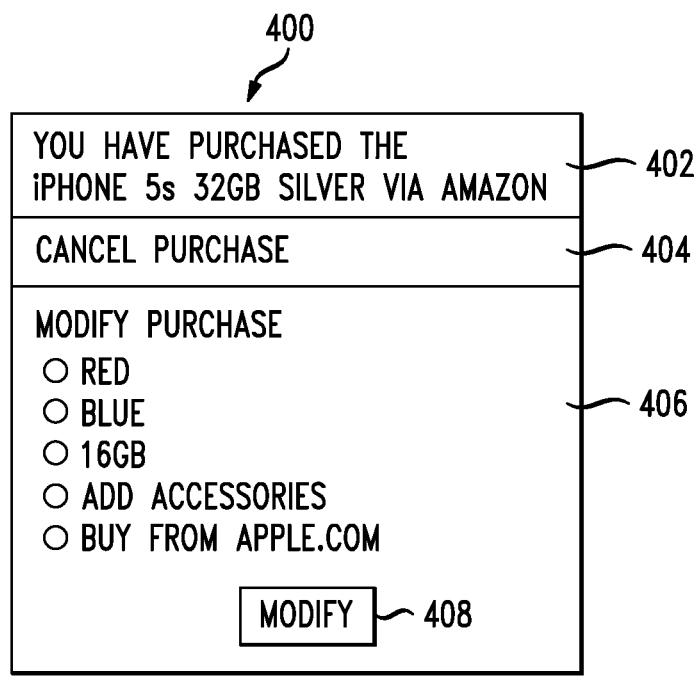
FIG. 4A illustrates a first example resulting interface according to an aspect of this disclosure.

Because the user input in field 302 is a product, the example drop down menu options can include a standard Google search 304. Although this is the first option, the system can arrange the drop down menus to place this option lower if the algorithm determines that the user is less likely to desire a Google search. The system can present more likely options closer to the input field 302, or closer to the mouse cursor, for example. If a user selects that option, then the result that is returned would be as though the user had entered "iPhone 5S" as a Google search. The drop down menu can include an Amazon.com one-click purchasing option 306. If the user selects this option, the system can process the input as though the user were on Amazon.com, having searched for an iPhone 5S, and at a screen in which the user can select to "one-click", execute the purchase of the product for the user. In another variation, the system can present a one-click option at the one-search page, directly from the drop-down or drop-up menu. So, the user could click a button, an image, or a link to place the order with Amazon.com as if the user had navigated to the one-click point at Amazon.com and clicked the "order now" button. In this case, FIG. 4A illustrates the resulting screen 400 presented to the user from choosing option 306. Screen 400 includes data 402 informing the user that the iPhone 5S had been purchased via Amazon.com. When a color was not provided, the system can chose the most likely color for the user or for similar users. In this case, the system selected silver. A storage size of 32 GB is also shown as part of the purchase data.

In the case of unwanted or unintended purchases as people perhaps hit a wrong key or chose the wrong drop down menu option, the system allows users to cancel the purchase 404 or modify the purchase 406. The user can modify any number of different options depending on the product. Options shown by way of example include changing the color from silver to gold or black. Similarly, the system can display an option to change the storage size to 16 GB. An option such as "add accessories" can bring the user to another interactive screen to choose accessories. The system can determine which modification options to present and the order in which to present them based on a confidence score for each option. For example, the system may have a confidence score of 95% that the user wants a silver iPhone 5S, and can either not display the option to modify the color, or can display the option in a less prominent place or manner, or can provide the option to change the color through a menu or other 'hidden' location. This approach can allow the system to present purchase or item options to the user so that the user is only concerned with and can easily modify options about which the system is less sure. The system can present options to modify not only details about the actual item itself, but also about details surrounding the order, such as delivery address, billing address, payment method, or delivery method. The system can even allow the user to switch the order from one merchant to another merchant, if the user inadvertently clicked the wrong menu item in the pull-down menu, for example.

In that the entity which is processing the purchase is Amazon.com, as is noted in field 402, the system could also present an option to process the purchase through Apple.com. If any of these options are chosen, then the user selects the modify button 408 and the order is modified and automatically continues to be processed. Of course the system has the user profile, purchasing (credit/debit/PayPal, etc. account), address and any other information and can move seamlessly between purchasing/processing entities with ease. When the user sets up a profile and account on the website, all of these permissions and accessibility capability is established and approved. In this manner, operations necessary between entities to complete a purchase can be divided as necessary. Thus, an example of seamlessly moving operations between purchasing and processing entities can include the system handling a purchase and delivery transaction of an item by enabling a payment account registered with one entity (such as Google), to be used to pay for an item while the system coordinates with another processing entity, such as a merchant or retail partner, to handle filling the order.

Returning to FIG. 3, feature 308 represents an Apple search. If the user selects this option, then the next field that is returned would be as though the user searched for iPhone 5S on Apple.com. The information presented by Apple on that product would be presented to the user. Optionally, the system can prompt the user to provide or confirm credentials for logging in to Apple.com. In that the transition from one-search.com to Apple.com occurred from one-search.com, the system can present an option in the new Apple.com web page to enable the user to return to one-search.com for further searches. For example, the system can provide a frame, in the browser, for returning to the one-search.com search while presenting the Apple.com web site. The frame can allow the user to modify the original input text, which can dynamically change aspects of the presented Apple.com web site presented in conjunction with the frame.

Figure 4B:
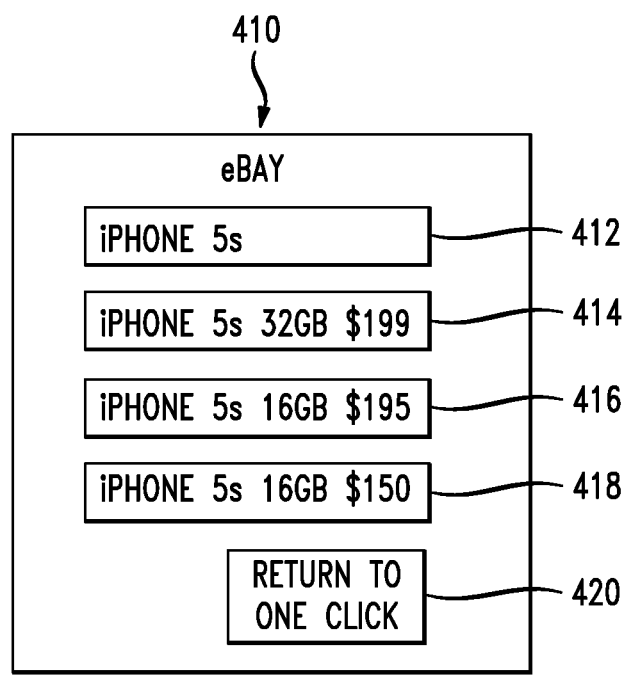
FIG. 4B illustrates a second example resulting interface according to an aspect of this disclosure.

Feature 310 in FIG. 3 represents an eBay bid option. In this case, if the user selects this option, the system sends the user to eBay and presents a screen 410, as shown in the example user interface of FIG. 4B, as though the user had gone to eBay.com and entered in "iPhone 5S" into the eBay search field 412. Feature 414 represent a selectable returned item for an iPhone 5S 32 GB with a current bid at $199. Feature 416 is an iPhone 5S 16 GB for $175 and feature 418 represents an iPhone 5 16 GB at $150. All of these are examples of the kind of processing that can occur. As noted above, a "return to one-search" button 420 can also be included in the screen for easy access back to the one-search field. The system can transition to the indicated destination page, such as the Apple.com, eBay.com, or Amazon.com purchase page for an iPhone 5S as an overlay, such that returning to the one-search field involves removing the overlay instead of a back navigation command to a previous page.

FIG. 3 also shows an Amazon search 312. When the user chooses this option, the system can present a screen as though the user had searched on Amazon.com for an iPhone 5S. From there, the user could continue shopping and searching as though the user had begun browsing on Amazon.com. The drop down menu can include an option to purchase the product directly via Apple.com 314. If the user selects that option, and assuming that there is not a "one-click" purchase option at Apple.com, the user is brought to the point where they can, in very few interactions, complete the purchase. For instance, the system can bring the user to a shopping cart showing the product ready to be purchased. In one option, the system brings the user to the point of seeing the product and being able to place the product (iPhone 5S) into a shopping cart. In another aspect, the system could navigate the shopping cart model on behalf of the user and complete the purchase, thereby making the transaction a one-click purchase.

FIG. 3 also shows another embodiment of this disclosure. In this case, because the "drop down" menus include different types of data, the options can include a "drop down" menu as well as a "drop up" menu. The purchase options could be dropped "up" as shown in features 316 and 318, while all of the search options or more traditional options can be dropped "down." The system can present menus to the left, right, diagonal, or in any direction, orientation, or angle as desired. Separating the purchasing options from search-type options can also reduce the number of inadvertent purchases. In this example, the drop down menus of FIG. 3 could only include features 304, 308, 310 and 312 as these involve further searching. The system can position items 306 and 314 in "drop up" menus 318 and 316, respectively. The algorithm can predict the most likely search if the user desired a search and the most likely purchase if the user were to desire to purchase the item and position those as the first option down and the first option up in the menus. The user could use the arrow buttons on a keyboard or a touch screen to select the desired options. Alternatively, the drop down or drop up menus can indicate shortcut keys which the user can press to select the options without using the mouse. For example, the menu can indicate that the user can press alt-1, alt-2, or alt-3 to select the various drop up menu options, or ctrl-1, ctrl-2, or ctrl-3, or some other single key or key combination to select the various drop down menu options. The system can present auto-complete options which the user can activate using similar keyboard shortcuts. For example, if the user has typed "iPhone," the system can indicate that pressing "S64" after "iPhone" would autocomplete to "iPhone 5S 64 GB." The types and quantities of such autocomplete keyboard shortcuts can vary widely depending on the determined intent of the user, as well as attributes of the product as the system understands it up to that point. Voice activity or gesture input or any other type of input can enable the user to select a desired option.

In some cases, the system can determine that the data in the search field is not intended for a purchase. For example, if the user enters the text "South Dakota," the system can identify that the user does not desire to make a purchase. The "drop down" menu in that case could simply list the traditional search options, or could list options to one-click purchase items related to South Dakota, such as a South Dakota t-shirt or a souvenir of Mount Rushmore.

The user can also add hints or shorthand instructions in the search field to guide purchase options presented in a one-search.com field. For example, the user can provide the text "buy amaz iPhone 5S." These hints tell the algorithm that the user desires a purchase function, and that the desired merchant is Amazon. Based on these types of hints, the system can eliminate features 304, 308, 310, 312 and 314 from the drop down menus shown in FIG. 3. In that case, the user could just hit "return" and the most likely desired product will be automatically purchased and processed for shipment. Options to cancel or modify of course can be presented, such as the cancel purchase button 404 and modify purchase button 408 shown in FIG. 4.

In one embodiment, the unified input field is part of an application downloadable or installable on a smartphone, tablet, or other mobile computing device. The functionality could also apply to a unified search field on a website. The application can be customizable as can any website disclosed herein. The application includes a single input field that is generic to multiple different types of processing. For example, the application can present an input field with a number of different options, such as a Skype or telephone call. The field therefore can be used to input a search for a contact. The user could type in the field "mom" and then select the Skype® video conference option, or the Face-Time® option. The system processes the input field according to the appropriate context by extending a video conferencing request or making a phone call. It is important to note that the unified field concept disclosed herein is not limited to the processing of the user input being related to web searches or purchases. Other functionality can be implemented from the unified field. Phone calls, video conferencing, triggering of any sensor on a smartphone, taking a picture, sending a text, etc. Several examples if these features follow. In the unified field, the user may input the text: "Mark S., are we getting together for lunch?" The user may then select the processing option of "texting," chatting in an online chat room, or posting the comment on a social media website, and so forth.

Figure 5:
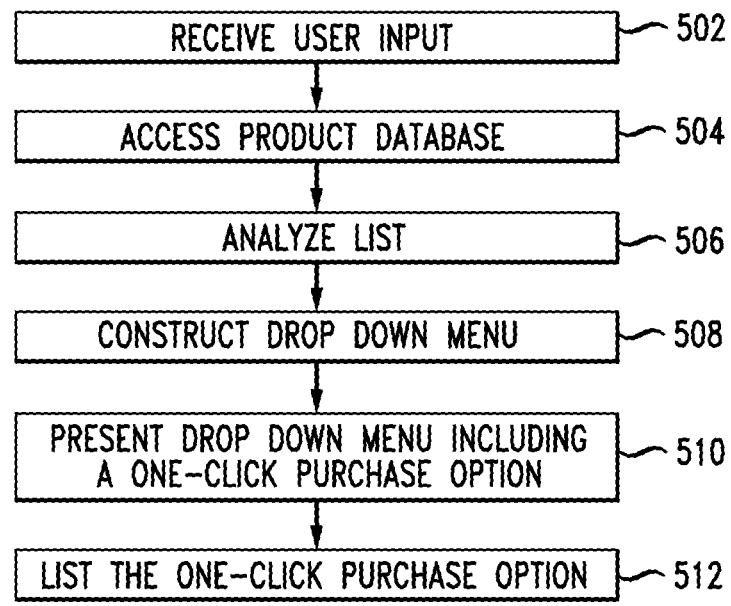
FIG. 5 illustrates a method embodiment for presenting a one-click purchase option relating to a search input.
Figure 7:
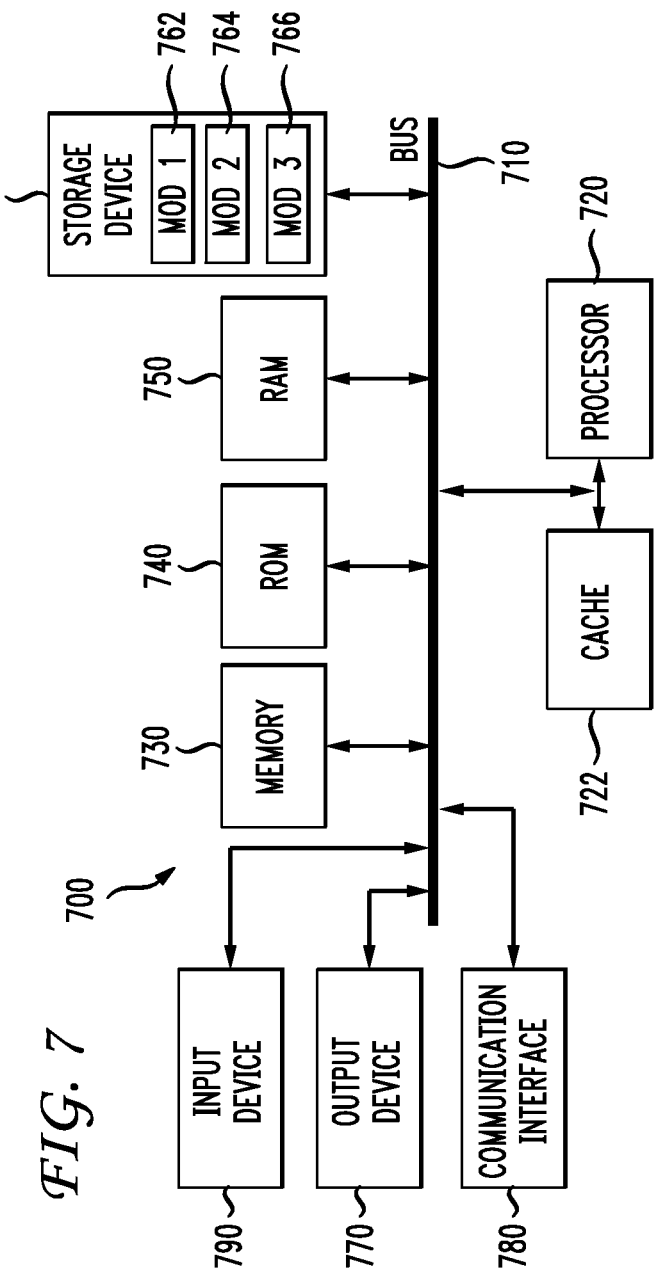
FIG. 7 illustrates an example system embodiment.

Having disclosed some basic system components and concepts, the disclosure now turns to the exemplary method embodiment shown in FIG. 5. For the sake of clarity, the method is described in terms of an exemplary system 700 as shown in FIG. 7 configured to practice the method. The steps outlined herein are exemplary and can be implemented in any combination thereof, including combinations that exclude, add, or modify certain steps.

FIG. 5 illustrates a general method embodiment. The system receives user input (502). The system can access a product database in processing the user input (504). For example, if a new product just came out and is available for purchase on-line, the system can access that information so that when a user enters "iPhone 5S" that the system can match that input with a product. The system analyzes the input (506) for a determination of the user intent. For example, if the user enters "Rhode Island" the system can calculate a very low likelihood that the user desires to purchase Rhode Island. User profile, user search and purchasing history, and any other data can be used by the algorithm to determine how to structure an extendible menu to enable the user to quickly make a choice of what they desire. However, as the user enters additional text, the system can update autocomplete options accordingly. For example, if the user enters "Rhode Island cookbook," the system can, at some point, determine that the user is not likely interested in the state, but in a cookbook, which is a purchasable item. The system can then adapt the autocomplete options automatically as the user continues to enter additional text.

FIG. 5 next shows analyzing the input (506) using all this data and information and constructing a menu (508) or a presentation of various options. This construction can also include a marketing aspect as companies may pay for how the option is presented. Amazon.com, or a product manufacturer, can pay a small fee to present their product with graphics or multimedia content, if it appears that the user may desire to buy that product, in order to encourage the user to select that option to purchase the product. The system presents the menu or other structured presentation of options for the user to choose (510). The options include one or more purchasing options (512) when the user input indicates via the algorithm that a purchase may be desired.

In another aspect, a classifier can process the user input in the general unified search field. The classifier can be trained to determine the intent of the user and to select which websites or applications to provide in response to the input. Classification algorithms are often used in processing speech or phone calls. For example, some classification features can process and classify calls in various call types like local, international, voicemail, conference, etc. In some cases, as a user calls an interactive voice response system, a classifier can be trained using previous calls to process the user input to conclude that the user wants to talk to accounting or pay a bill. For example, the user might say in the call "I want to pay a bill" or "I need help with my account." By classifying that input, the system can route the call to the right person, destination, or entity.

Technologies that are used for classification include statistics, data mining, pattern recognition, machine learning, and in some cases neural computation and artificial intelligence. A general classification system approach involves receiving input, preprocessing the input, segmenting and labeling the input, extracting features from the input, post-processing, and ultimately classifying the input to arrive at a decision. While these principles have been applied in many fields, these technologies can be applied to a new classification domain. The new classification domain is the context or intent of a unified input field such as on a browser in which the user provides input, and that input can be applied to many different websites, applications, or actions. Right now, when a person goes to google.com, the assumption is that the user wants to search the internet. When a user goes to Amazon.com, the user wants to buy something. The user must go to different websites for these different functions, requiring additional, unnecessary mouse clicks. This disclosure provides, in one respect, the introduction of a classifier that processes user input in a field on a website where there is no assumption that the user wants to search or buy a product. The classifier will determine via a classification decision what the intent of the user is.

In order to train the classifier, which is called herein an 'intent classifier', the system can monitor the web usage of a user for a period of time. The classifier can utilize data of one user or multiple users. For example, one could generate training data of input at a google input field compared to input in an amazon.com input field for people of a particular demographic, such as 20-30 year old men, or women or a particular minority or religious group. The training data preferably would be particular in some respects to the individual user. If a user is logged into a browser such that it can connect to that user's training data or relevant training data, then the system can more efficiently process the user input in the unified input field. The system can use supervised learning (or unsupervised or semi-supervised learning) to label the training set so that the training data can provide which class (i.e., search, purchase, Wikipedia, etc.) the input belongs to. The training data involves the input provided via a search field as opposed to a purchase field. Other fields can apply as well such as auctions, medical advice, twitter input text, and so forth. The general concept is that there is no assumption when the user inputs data into the field regarding what the desired function is.

Other data that can be useful for the training model is personal user information. For example, if the user is registered for making one-click purchases at amazon.com, then when the user types in "Android 4.4 KitKat", the system will know that the shortest number of clicks and computer interactions possible for the person to complete a purchase of the most popular smartphone with Android 4.4 is through Amazon.com. Otherwise, the user might be sent to another website and have to go through the shopping cart model, enter their credit card, and take a lot of extra time and effort to complete the purchase. Thus, knowing that the user is registered at one or two purchasing websites (thus enabling a quick "one-click" purchase) can drive the result of the classification.

In another example, the classifier in this case can have classification types of search, browse, purchase now, play game, update software, send email, send tweet, check Facebook, make call via Skype, and so forth. Some of the classification data for a trained model can be drawn from the different types of input that are used in input fields between google.com, amazon.com, Wikipedia.com, and so forth. The system for training the classifier can look at the different types of input in connection with which website is being used and develops training data. In other cases, if a user types in "call mom", such input would not be provided in an input field because normally the user would go to the Skype App or other calling app and choose his mother to make the call. Thus, in other cases, training may occur in a different way to capture that "command" type of input. However, since there is no assumption of the desired intent of the input at the start, such training can be used to enable the user to perform a host of functions starting at one input field.

The user can in this case also provide hints as to the desired input. It might be quicker for the user to type "buy" before "iPhone 5S" so that the entire input is "buy iPhone 5S" than moving one's hand to the mouse and moving the mouse to click on an amazon.com tab in a browser or on an icon, or typing "www.amazon.com" in an input field for URL's. Clearly, the suggestion to buy tells the classifier that a purchase is the intent. Currently, typing in "buy iPhone 5S" is still considered via a searching algorithm in which search results are provided. The system can show sponsored advertisements which enable the user to go to an advertisement or promotional page for the iPhone 5S, but those still take additional clicks to get to the point of actually being able to make a purchase. Further, the system can still present the results on a webpage (google.com) that does not enable the user to complete a purchase/delivery within one click.

Therefore, the classification algorithm according to this disclosure can utilize training data which includes different kinds of input that the user or similar users have provided via input fields on various web pages to determine an intent describing which web page the user desires to open, or which action the user desires to perform on the web page. The system can user other data to make the determination, such as time of day, time of the year, social media data like birthdays of friends, holidays, weather information, which websites the user had made purchases on and with which website the has previously registered, etc.

For example, the classifier might determine that the user wants to make a purchase. The classifier can make a basic determination of an intent to search or an intent to make a purchase. Then the classifier can take a secondary step to determine based on history, user profile, registrations, best price, closest outlet to the user's address, etc., at which merchant the user likely wants to make the purchase. If the user has an account set up at amazon.com, then the system may choose amazon as the primary likely destination and take the appropriate step. For example, the system can create a new tab with the input term pre-entered at amazon.com, or where the user can open the tab and be at the state in the amazon.com website where the user can just click the "one-click purchase" button to complete the purchase. The system can present the new page in a new tab, within the same page as the unified input field, or in some other fashion.

Figure 6:
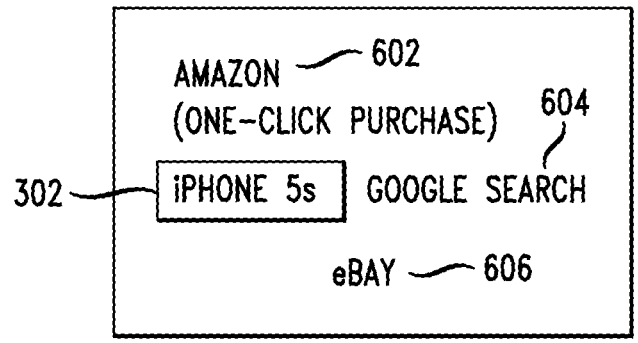
FIG. 6 illustrates another graphical resulting interface in response to received user input.

The system can, instead of a more traditional menu, present the options in a completely different form, such as a tag field. FIG. 6 illustrates options in which parameters associated with each selectable option are chosen based on relevance. For example, the system can select and modify positioning, size, shape, color, detail, of the items in the tag field for various options. Feature 602 is an Amazon one-click purchase. Feature 604 is a Google search and feature 606 is an eBay search. In a tag cloud or word cloud, the size, shape, color, and other details of the items can provide information about the items. In this example, the Amazon one-click purchase 602 is listed in a large font, in bold, and in close proximity to the search field 302. The large font can indicate that the system has determined that it is highly relevant to the text entered in the search field. The bold font can indicate that clicking the item will trigger a purchase. The eBay search 606 is similarly large, potentially indicating that it is also highly relevant, but not bold because there is no one-click purchase associated with that item 606. The Google search 604 is presented to the side, in a smaller font, indicating that is may be of lesser relevance or importance. The various details of these items can vary in a smooth, animated fashion as the user enters additional information in the search field 302. For example, as the user enters more information about the specific desired iPhone, the system can adjust the Amazon 602 option on the user interface to gradually increase in size, move closer to the search field, be drawn with thicker lines, and so forth. The system can provide these details as an animation for the user so that increasingly relevant items are presented in increasingly discoverable places or increasingly prominently.

FIG. 6 illustrates various options of how to structure and present the selectable options from a one-search input field. In one aspect, traditional drop down options can be presented in a normal fashion with purchasing options presented like feature 602 in FIG. 6 thus providing a further differentiation of which items are standard drop down menu, auto-complete type options and which ones are one-click purchasing type options. The system can, in the tag field or in other embodiments, present targeted advertising. For example, in FIG. 6, the user could have entered "buy Amazon iPhone 5S." This would result in a high likelihood or probability that the user wants to buy that product via Amazon, thus causing the system to present feature 602 showing that option in a large font and close to the input field 302. In other words, like tag clouds which make larger words of higher usage or interest in a story or from cloud input. Feature 604 could represent a paid-for advertisement from a competitor who may offer a cheaper price for the same product. Such information could be presented as part of an icon or advertisement represented as feature 604.

Figure 8:
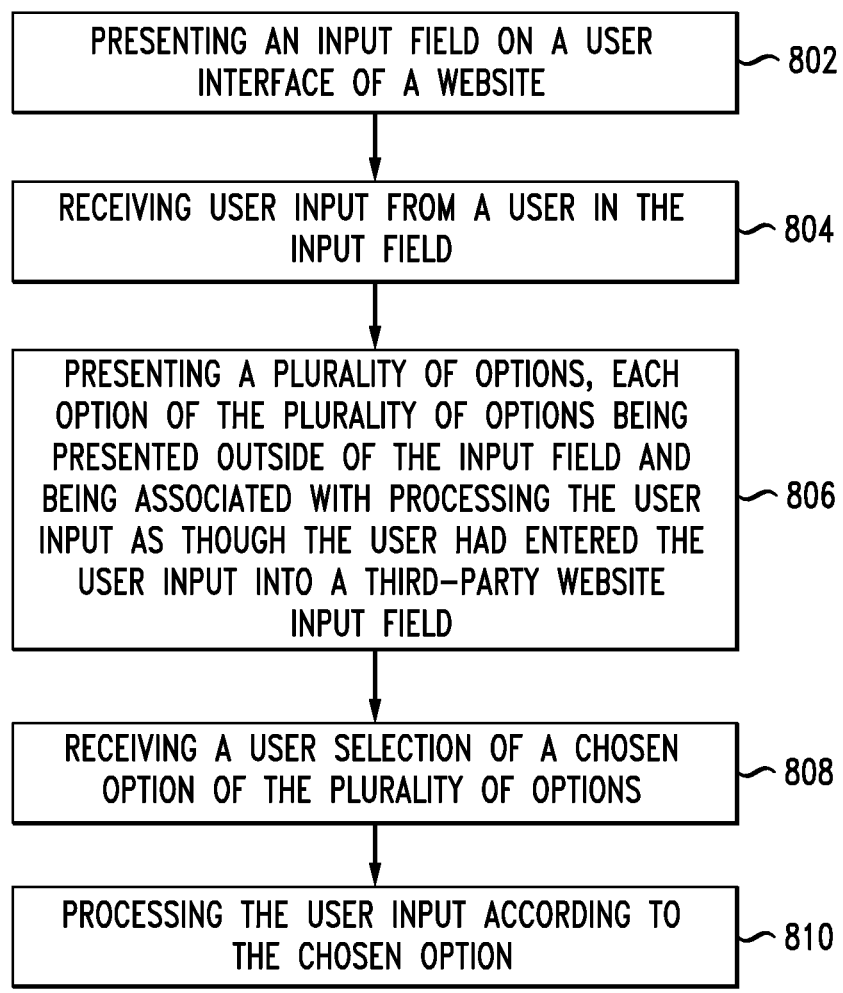
FIG. 8 illustrates an example method embodiment for processing a selection from a user.

FIG. 8 illustrates an example method embodiment. In this embodiment, the system can present an input field on a user interface of a website (802). Then the system can receive user input from a user in the input field (804), such as text entered via a keyboard or speech input in a text field. Then the system can present a set of options, each option being presented outside of the input field and being associated with processing the user input as though the user had entered the user input into a third-party website input field (806). Then the system receives a user selection of a chosen option of the set of options (808), and processes the user input according to the chosen option (810).

A description of a basic general-purpose system or computing device in FIG. 7 which can be employed to practice the concepts, methods, and techniques disclosed is illustrated. With reference to FIG. 7, an exemplary system and/or computing device 700 includes a processing unit (CPU or processor) 720 and a system bus 710 that couples various system components including the system memory 730 such as read only memory (ROM) 740 and random access memory (RAM) 750 to the processor 720. The system 700 can include a cache 722 of high-speed memory connected directly with, in close proximity to, or integrated as part of the processor 720. The system 700 copies data from the memory 730 and/or the storage device 760 to the cache 722 for quick access by the processor 720. In this way, the cache provides a performance boost that avoids processor 720 delays while waiting for data. These and other modules can control or be configured to control the processor 720 to perform various operations or actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the processor. The processor 720 may be a self-contained computing system, containing multiple cores or processors, a bus, memory controller, cache, etc. A multi-core processor may be symmetric or asymmetric. The processor 720 can include multiple processors, such as a system having multiple, physically separate processors in different sockets, or a system having multiple processor cores on a single physical chip. Similarly, the processor 720 can include multiple distributed processors located in multiple separate computing devices, but working together such as via a communications network. Multiple processors or processor cores can share resources such as memory 730 or the cache 722, or can operate using independent resources. The processor 720 can include one or more of a state machine, an application specific integrated circuit (ASIC), or a programmable gate array (PGA) including a field PGA.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 760 can include software modules 762, 764, 766 for controlling the processor 720. The system 700 can include other hardware or software modules. The storage device 760 is connected to the system bus 710 by a drive interface. The drives and the associated computer-readable storage devices provide nonvolatile storage of computer-readable instructions, data structures, program modules and other data for the computing device 700. In one aspect, a hardware module that performs a particular function includes the software component stored in a tangible computer-readable storage device in connection with the necessary hardware components, such as the processor 720, bus 710, display 770, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 700 is a small, handheld computing device, a desktop computer, or a computer server. When the processor 720 executes instructions to perform "operations", the processor 720 can perform the operations directly and/or facilitate, direct, or cooperate with another device or component to perform the operations.

Although the exemplary embodiment(s) described herein employs the hard disk 760, other types of computer-readable storage devices which can store data that are accessible by a computer, such as magnetic cassettes, flash memory cards, digital versatile disks (DVDs), cartridges, random access memories (RAMs) 750, read only memory (ROM) 740, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 740 for storing software performing the operations described below, and random access memory (RAM) 750 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage devices. Such logical operations can be implemented as modules configured to control the processor 720 to perform particular functions according to the programming of the module. For example, FIG. 7 illustrates three modules Mod1 762, Mod2 764 and Mod3 766 which are modules configured to control the processor 720. These modules may be stored on the storage device 760 and loaded into RAM 750 or memory 730 at runtime or may be stored in other computer-readable memory locations.

One or more parts of the example computing device 700, up to and including the entire computing device 700, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 720 can include all types of processors disclosed herein, including a virtual processor. However, when referring to a virtual processor, the processor 720 includes the software components associated with executing the virtual processor in a virtualization layer and underlying hardware necessary to execute the virtualization layer. The system 700 can include a physical or virtual processor 720 that receive instructions stored in a computer-readable storage device, which cause the processor 720 to perform certain operations.

When referring to a virtual processor 720, the system also includes the underlying physical hardware executing the virtual processor 720.

In each case within this disclosure, reference to "Amazon" or Amazon.com" is broad enough to encompass any purchasing/delivery or ecommerce website, as well as websites for traditional, brick-and-mortar businesses that provide goods or services. References to a "Google" site or search refer to any generalized search engine. In many instances, the principles set forth herein may be applicable to other, non-search and non-commerce sites, which the system can manipulate or traverse in order to accomplish a specific, intended action on behalf of the user.

FIG. 8 illustrates an example method embodiment. A system will perform the steps of the method. The system presents an input field on a user interface of a website (802) and receives user input from a user in the input field (804). The system analyzes the input to determine whether the user wanted a search, to make a purchase, to perform some other function such as making a call, or watching a video, and so forth. The system presents a set of options, each option of the set of options being presented outside of the input field and being associated with processing the user input as though the user had entered the user input into a third-party website input field (806). FIGS. 2 and 3 provide examples of presenting the set of options for processing. A component of this approach is that the input field is not pre-designated or pre-designed to process the input in one particular context, but the input field is open to a variety of ways of processing the input, thus reducing the number if clicks necessary to navigator from one website to another to input data. The system receives a user selection of a chosen option of the set of options (808) and processes the user input according to the chosen option (810).

A first option of the set of options can be associated with a search engine and a second option of the set of options is associated with a purchase-processing engine. If the chosen option is the second option and associated with a purchase-processing engine, then the system will identify in item associated with the user input and process a purchase of the item and delivery of the item to the user. If the chosen option is the first option and associated with a search engine, then the system processes the user input to perform a search associated with the user input and returns search results. The method can also include identifying respective types for the set of options and presenting the set of options in groups based on the respective types.

The user input can include at least one of text input, multimodal input, gesture input, or voice input, or any combination thereof. The user can have a pre-existing account storing preferences governing how the set of options are presented.

Figure 9:
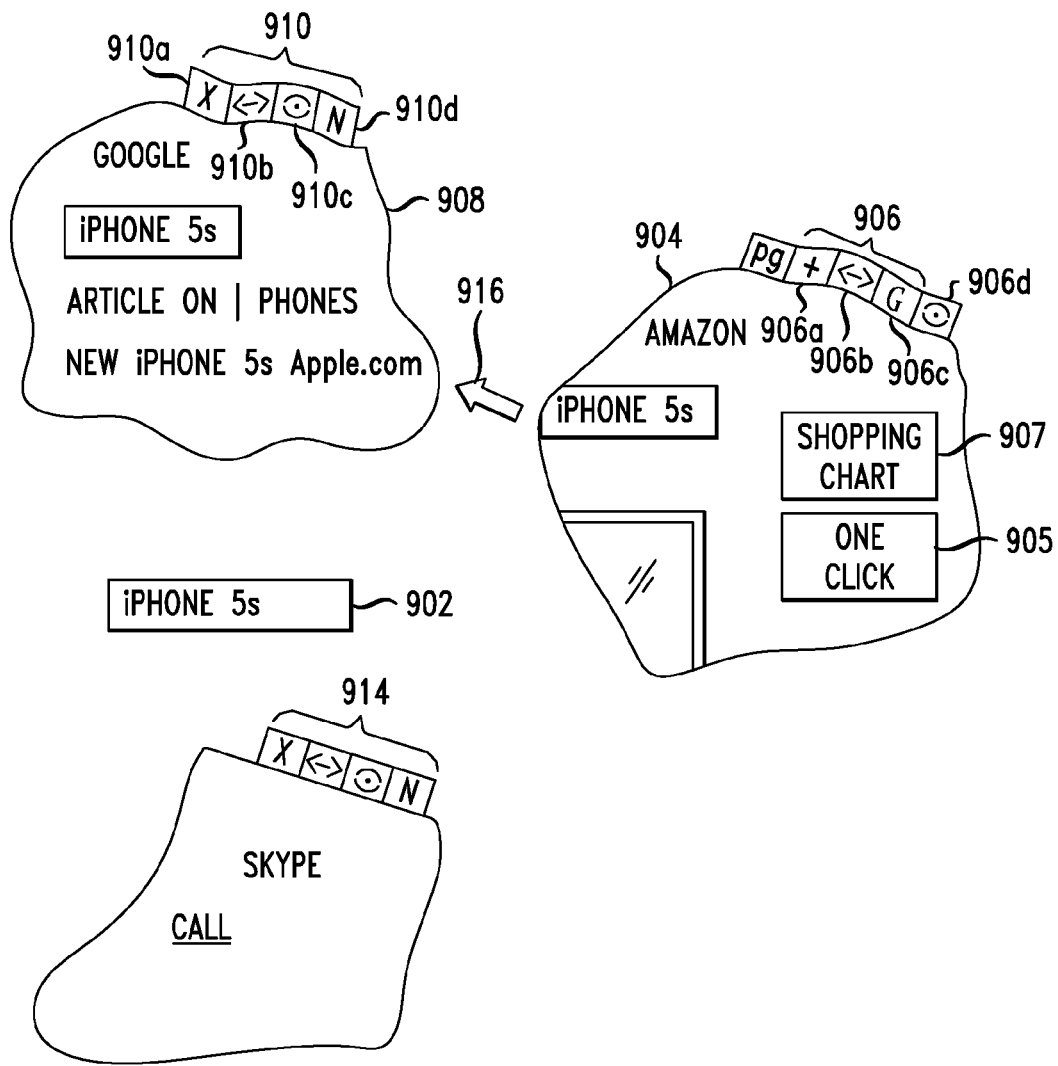
FIG. 9 illustrates a user interface associated with an embodiment.

Executing an Action Based on Input Directed to a User Interface Integrated from Another Source FIG. 9 illustrates a user interface associated with an embodiment. In this example user interface, the user enters the text "iPhone 5S" into a unified input field 902. The browser communicates the text to a one-search server that returns navigation destinations. The web browser can render "tears" 904, 908 in the page that appear to be holes in the interface peering into underlying other pages. The tears have two position considerations, the position of the tears in the host page, and the view of the tears onto the destination page. The system can consider both of these positions when determining the location and size of the tears to present. The user can click on the tear to navigate to that destination website. In that case, the tear can transition in the same manner as a click on a link to navigate to a different page, or can present an animated transition, such as expanding the boundaries of the tear until the tear completely replaces the previous page. The tears can include various controls 906, 910, 914 fitted along an edge of the respective tear so a user can manipulate the tear to move, maximize 906a, expand 906b, 910b, preview 910c, 906d, close 910a, go to the page 906c, or perform some other action on the tear. Further, the user can directly manipulate exposed user interface elements shown in the tear, such as the one-click purchase button 905 or the view shopping cart button 907. Some tears can show other non-web actions, such as a view into a Skype application to make a call. The system can position tears that are a closer match to an intent determined from the text entered in the unified input field so the more important tears are closer to the mouse cursor 916 or to the unified input field, for example. The system can expand a tear dynamically as a mouse 916 moves closer to the tear, and shrink the tear as the mouse 916 moves farther away. The tear edges can be any shape, including standard geometric shapes, or can have more complex edges that are sharp or smooth, or that are dynamic and can change based on various factors.

In a touch-based interface, a user can use touch gestures to manipulate the tears. For example, the user can tap and hold on a tear to begin moving the tear around on the page. The user can swipe to move the view of the page in the tear, or pinch to zoom on a page displayed in the tear. A user can double tap on a tear to navigate to the page displayed in the tear. The system can display content in the tears at a same zoom factor as the host page, or can shrink the content displayed in the tears to display a broader view of the content.

Figure 10:
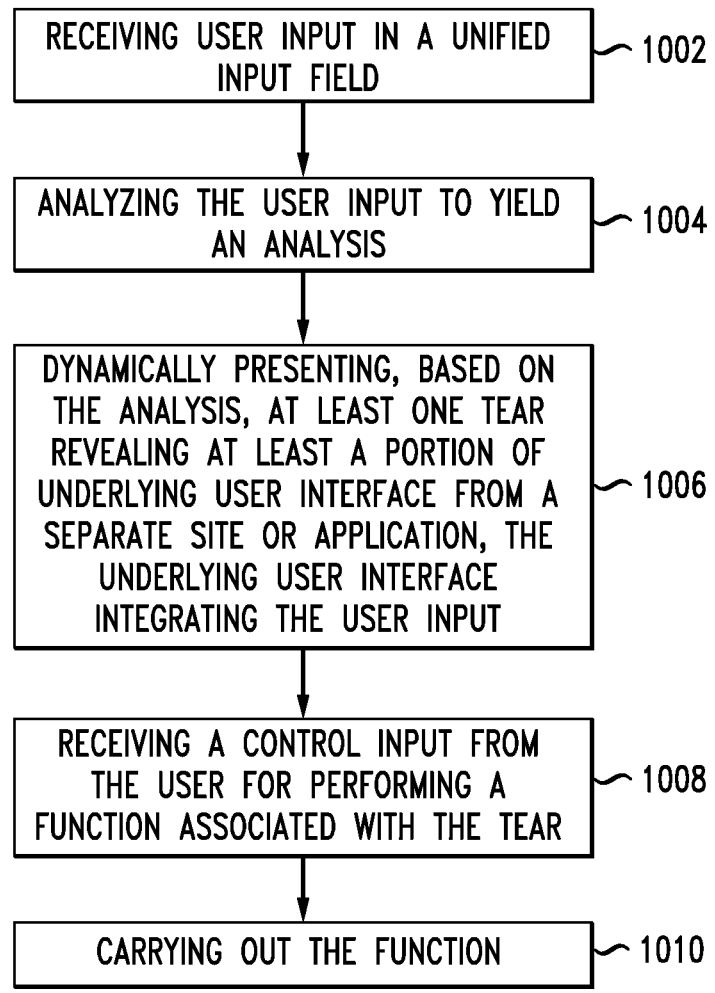
FIG. 10 illustrates a method embodiment for executing an action based on input directed to a user interface integrated from another source.

FIG. 10 illustrates an example method embodiment for executing an action based on input directed to a user interface integrated from another source. In this example, a system performing the method receives user input in a unified input field (1002). The system analyzes the user input to yield an analysis (1004). The system dynamically presents, based on the analysis, at least one tear revealing at least a portion of underlying user interface from a separate site or application, the underlying user interface integrating the user input (1006). The system receives a control input from the user for performing a function associated with the tear (1008). The system can then carry out the function (1010).

Modifiable Entry Button

A system, method and computer-readable storage devices are disclosed which dynamically morph or adapt the search button associated with a unified input field based on an intent determined via a classifier and based on text provided to the unified input field. Typically a unified input field has two main components: a text input field, and a search button to execute a search based on input provided via the text input field. The search button is typically labeled with the text "search" or "go" or something similarly generic. However, as the user enters a search term, the system can identify some other, more specific action, and can modify the search button to not only display different a different text or graphical label, but can also modify the action associated with the button accordingly. Additionally, the system can expand the single search button into multiple buttons.

For example, the user enters the text "Apple." At that point, the classifier does not determine that the text string "Apple" is sufficiently tied to a specific action or item to modify the label on the search button. So the search button remains unchanged. The user continues to enter the text "Apple iPhone." At this point the classifier identifies, based on the additional text, that several specific items or actions are likely, but too many of the items or actions are available or none are above a certainty threshold to modify the search button. The user continues on to enter the text "Apple iPhone 5S," at which point the classifier identifies a model of iPhone, the 5S. Then, based on user preferences or on other available data, the classifier can identify a specific variant of the iPhone 5S, such as a gold 64 GB iPhone 5S. Thus, the system can modify the label of the search button to no longer say "search," but instead to say "Purchase iPhone 5S, 64 GB, Gold." The user can, at that point, simply hit enter on the keyboard to execute that action and purchase the indicated iPhone 5S.

As an alternative to modifying the search button, the system can generate and present additional buttons next to the search button. The system can provide an indication that different keys or key combinations will activate the different buttons. For example, hitting enter will activate the functionality associated with the "search" button, while hitting ctrl-enter will activate the functionality of the "Purchase iPhone 5S, 64 GB, Gold" button. As the system presents additional buttons, the user can also click on the additional buttons to activate their various associated actions.

In some cases, the modified button can still require some additional disambiguation. For example, the modified button can be labeled "Purchase iPhone 5S, 64 GB." As the user presses enter to activate the modified button, the system can present an additional dialog or button modification, such as modifying the button to say "Press enter once for Gold, twice for Silver, or thrice for Black." After the user provides that input, the system can modify the button label to say "Press enter once to purchase from Apple, twice to purchase from Amazon." The system can modify the button label with these additional messages, or can present them at some other location on the page. In this way, the user can quickly enter the text associated with a desired action or purchase, and select the various options easily and without moving his or her hands back and forth between the keyboard and the mouse, and can navigate between a disambiguation decision tree using very simple and familiar inputs.

If the user makes a mistake or wants to cancel the selection, the user can simply hit backspace to delete characters in the entered text, which would potentially change the context, and trigger a reset of the modified button and corresponding action or actions. If the user made a mistake and wants to back out of the selection, he or she can simply hit the escape key or provide some keyboard, mouse, or other input indicating to the system to go back.

The system can learn the behavior patterns and preferences of the user and adapt accordingly, so that, over time, the system can require less and less input from the user to accurately determine or classify the user's intent. For example, the system can know which items the user has already purchased, which items the user has discussed with friends or family, which gift-giving events are coming up soon, and so forth. Based on all these data points, the classifier can make more accurate guesses regarding the user's possible or likely intent.

In a mobile device, which does not have a mouse and a keyboard, but instead is typically equipped with a touch sensitive screen or a stylus, the approaches set forth above may be modified. For example, instead of modifying a button in a traditional desktop style search field and search button pair, a mobile variation of the system can provide a search field for the user to enter text via an on-screen virtual keyboard, voice input, or some other input approach. As the user inputs text, the system can present a list of one-click actions in a drop down manner from the search field. While some of the one-click actions may be implementing a search in the traditional manner, other one-click actions may include navigating to a specific stage in a website, such as the stage in Amazon.com where the user is already logged in and simply has to execute the "one click" to purchase, or placing a bid on eBay, or at the final check-out phase of an online merchant's shopping cart with a desired item already added to the shopping cart. The user can dismiss one-click actions in the list by swiping them off the screen.

Figure 11:
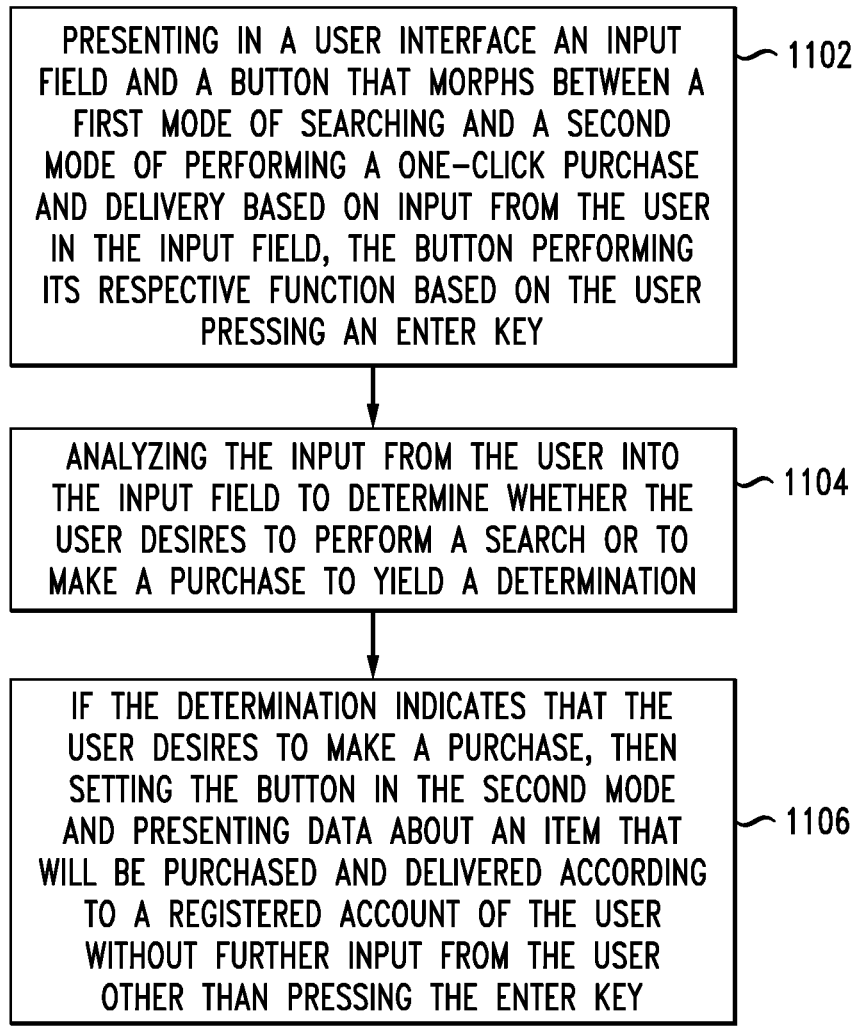
FIG. 11 illustrates an example method embodiment for a modifiable entry button.

FIG. 11 illustrates a method embodiment. The steps in the method embodiment can be performed in any order, can be performed in other combinations or permutations that include additional steps or exclude all or part of some of the described steps. The system can present in a user interface an input field and a button that morphs between a first mode of searching and a second mode of performing a one-click purchase and delivery based on input from the user in the input field, the button performing its respective function based on the user pressing an enter key (1102). The user interface, while receiving the input, can present disambiguation information indicating to the user what key entry is needed to disambiguate the item to be purchased, and wherein upon receiving the key entry from the user such that a confidence level in the item desired to be purchased meets a threshold, the button can morph into the second mode. The first mode of the button can be a default mode for the button.

The system can analyze the input from the user into the input field to determine whether the user desires to perform a search or to make a purchase to yield a determination (1104). If the determination indicates that the user desires to make a purchase, then the system can set the button in the second mode and present data about an item that will be purchased and delivered according to a registered account of the user without further input from the user other than pressing the enter key (1106). The system can manage the entire process of buying and delivering an item by processing a payment for the item from the registered account associated with the input field entity and coordinating the delivery of the item through a business partner merchant. The item can be a product or a service. The system can select the item that will be purchased and delivered based on a probability that the item is a most likely item that the user desires to purchase based on the input. For example, a classifier can determine the probabilities and the items based on a user history of purchases, a user history of searches, a time of day, a time of year, social media data, information about holidays, user profile data, and/or user account balance information.

Figure 12A:
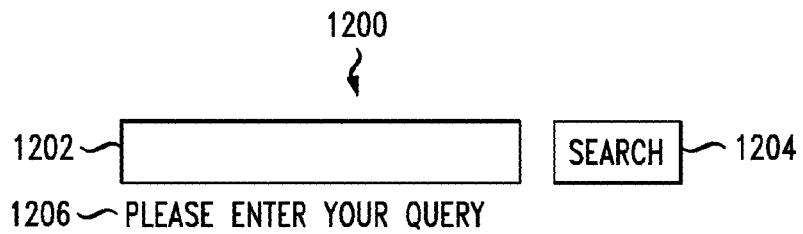
FIG. 12A illustrates an example modifiable entry button.
Figure 12B:
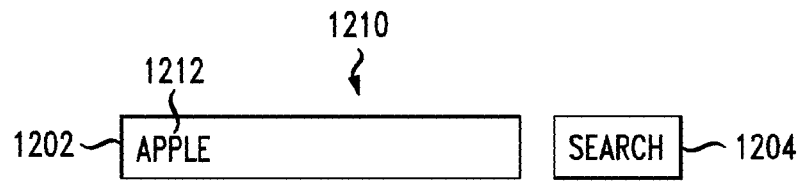
FIG. 12B illustrates input into an input field with a modifiable entry button.
Figure 12C:
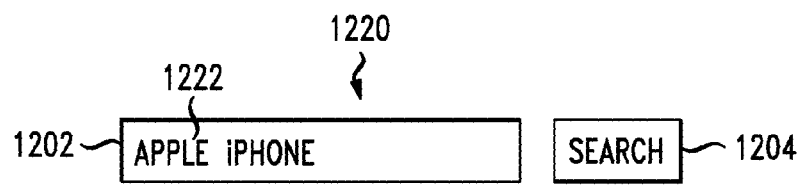
FIGS. 12C and 12D illustrate various changes and modifications that occur as a user types into an input field.
Figure 12D:
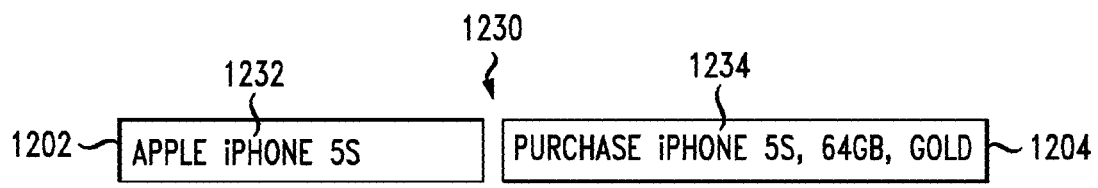

FIG. 12A illustrates a user interface 1200 with a generalized input field 1202 and a morphable search button 1204. The search button 1204 is really a generalized function button. The system can instruct the user 1206 to input a query or other input. The difference in this approach is that the function performed by hitting the "search" button will differ depending on the user input. This will be explained in stepping through the figures. FIG. 12B shows input in the interface 1210 starting to be put into the field 1202 of the word "Apple" 1212. The system processes this input to determine whether to change or modify the function performed when the user clicks "search" 1204 or hits the enter button. FIG. 12C illustrates additional input "Apple iPhone" 1222 in the user interface 1220. The system would continue to process that input and would be beginning to determine that perhaps the user desires to perform the function of a purchase as opposed to just a Google-type search. FIG. 12D illustrates an interface 1230 in which the input as continued to be more specific to include "Apple iPhone 5s" 1232. At a threshold point in analyzing the user input, the system reaches a high enough confidence that a particular function is desired. Here, the system changes the button 1204 from "search" to "Purchase iPhone 5s, 64 GB, Gold" 1234. Options not identified in the user input can be inserted into the text such that disambiguation can occur as well. But in this instance, the system, from a unified, generalized input field (from which searches and purchases can be made), enables the user to simply press "enter" or click on button 1204 in FIG. 12D and complete the processing and delivery of the purchase.

A further interface can include which various buttons are presented for clicking on by the user. Buttons can show different options for the user to make the purchase via "one-click." If there is still a likelihood that the user may simply want to search, then the search button can also be made available. One of these can be highlighted in some way to identify that if the user hits "enter" on the keyboard, that the particular highlighted button will be the one that will process the input as a purchase or a search. In this manner, the user can enter the input data first, and then perform the function, rather than first navigating to a website (like Google or Amazon.com), and then entering the user input data. Another interface allows the user to give a direct hint by typing "purchase iPhone 5S, 64 GB, Gold." In this case, the system could then present options for the user to purchase it through Apple with shipping information, or Amazon with its price and shipping information 1256 or through a carrier, for in store pickup. The system negotiates the necessary purchasing information (credit card, debit card, delivery address, etc.) with the various websites so that it is presented to the user as a one-click purchase in the interface. This currently is not available to users and they must navigate to the separate website, like Amazon.com, where they have such information registered.

In another example of how the search button can be morphed, in some browsers, the input field at the top can be used to either enter a URL or enter a google search. When you start with a search, there is a tag to the right of your typing that indicates what is going on. For example, like this: "dentists Dunkirk Maryland—google search." The "google search" language is not what the user types but is an indication that the browser is treating the text as a google search. This text of course can also be morphed such that as the text being typed is analyzed, the indication to the user of what will happen when "enter" is hit can change. For example, the user may start typing as see the following: "apple—google search." However, as the user continues to type, it may change as follows: "apple iPhone 5s—Amazon search." As the user continued to type and disambiguate, it could result in the following: "apple iPhone 5s 64 GB silver—Amazon one-click purchase." At this point, the user can hit "enter" and the system coordinates the information necessary to identify the product, purchase account information (which can be with one entity) and delivery information such that the desired product can be purchased and delivered to the user. Delivery can be managed by a second merchant entity from one entity that handles the payment processing.

Figure 13:
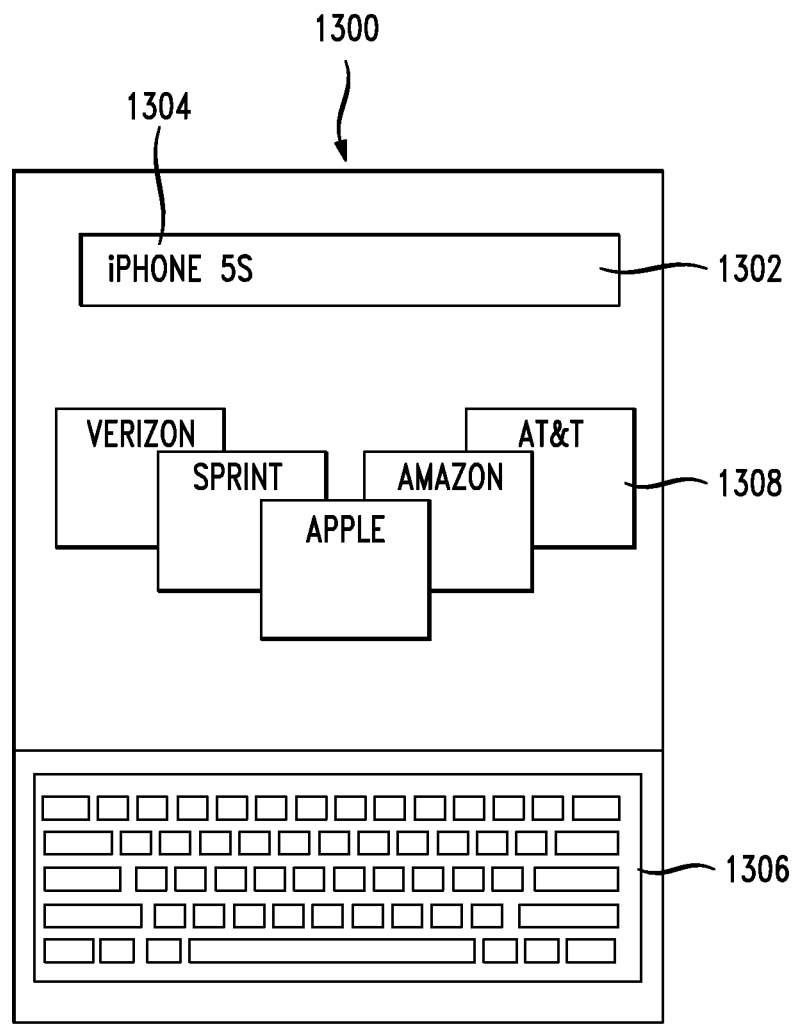
FIG. 13 illustrates an example user interface.

FIG. 13 illustrates a smartphone version of a user interface 1300 in which the input field 1302 has data 1304 that results in various options 1308 presented. A mobile keyboard 1306 is shown as well. Here, the one—search input field 1302 enables the user to put in a generalized input and have various "one-click" options 1308 to scroll through to process the input. Other user interfaces 1300 of course are contemplated for a mobile device or computer. An application and/or backend associated with the interface 1300 can preprocess purchasing and delivery information with various websites, vendors, etc. to enable the user to scan through options 1308 from different sources and just "one-click" from the chosen source. Further, the system can present preprocessed input to a stage not quite at a "one-click" stage but at a search-result stage such that the user can browse and study more before purchasing.

Universal Search Application Programming Interface (API)

A system, method and computer-readable storage devices are disclosed which replace a URL based on intent determined by a classifier that processes input provided to the unified input field. In a typical web search, a user clicks to select a search field, enters text, waits for the results page to load, clicks a desired link in the results page, and finally arrives at the desired link after waiting for it to load. This process requires many steps. A unified input field can simplify this process.

For example, one-search.com can provide a unified input field. The user provides input via the unified input field, such as a search for "iPhone 5S." The system can identify, based on a user profile and on the entered text, a most likely desired page, such as a top ranked page in a listing of search results. The system can modify the "search" button associated with the unified input field to indicate that pressing enter or clicking the button would transition the user to that top ranked page from the search results without the intermediate steps outlined above. However, if the user enters additional information, such as "iPhone 5S 32 GB Silver," then the classifier can determine, based on the text and in conjunction with a user profile or search history, that the user's intent is to purchase the indicated iPhone. In this situation, the system can modify the search button to link directly to an Amazon.com or Apple.com page as if the user had already navigated there, selected the iPhone 5S, 32 GB, silver, added the iPhone to the cart, and was at an advanced stage or potentially the final stage in the check-out process. In the case of Amazon.com, the system could modify the button to transition to user to a page ready for the user to make a one-click purchase of the indicated iPhone. Alternatively, the system can modify the button to also include the action of clicking the one-click purchase button, so that the user can go to one-search.com, enter the text in the unified input field, and hit enter to purchase through Amazon. In this case, hitting enter after entering the text in the unified input field could lead to a purchase summary of the just-executed order, potentially allowing the user to modify shipping options, product options, billing information, or other order details. In another variation, the system can place the order automatically based on the user hitting enter in the unified input field, and transition the user to a webpage for purchasing accessories, service related to the item purchased, technical support pages, or some other related web resource.

Thus, the system can immediately transition the user from a one-search.com unified input field to a one-click purchase page on Amazon, for example, when the user hits enter in the unified input field. The system could also include the purchase in the transition action, so that the purchase is completed based on the user pressing enter in the unified input field. In this regard, one-search.com would handle the purchase but then coordinate with the second entity such as Amazon.com or a merchant to complete the delivery of the item.

The system can present different options or different destinations based on user input. For example, the system can present a message or indication that pressing "enter" by itself would transition the user to a one-click purchase page for the desired item on Amazon.com, while pressing "alt-enter" would automatically make the purchase on Amazon.com. The system can present a message to the user stating that pressing "shift-enter" would transition the user to a pre-populated shopping cart page on Apple.com, ready for the user to click "submit order." Multiple different keys and/or key combinations can trigger different behaviors based on the input in the unified input field. Further, the various actions and key combinations triggering those actions can change as the user enters additional text in the unified input field, or modifies text in the unified input field.

The user can establish preferences with the system, such as indicating that all purchases default to Amazon.com unless the price difference is greater than 20% at a different retailer with which the user has an existing account, or a price difference greater than 30% at a different retailer with which the user does not have an existing account. In this way, the system can act intelligently based on rules or policies that the user establishes.

The system can transition immediately to the new URL as if the user had clicked and navigated through a series of pages in a shopping cart, loading each page in turn and entering data automatically on the browser side, or the system can communicate with the target website directly to accomplish the various sub-tasks associated with selecting an item, adding that item to a cart, entering or selecting shipping and payment information, and so forth, leading up to the final stage where the user simply clicks "submit order." One example of such sub-tasks is that the one-search entity can process payment information and coordinate delivery data to the merchant who will deliver the item. The system can pre-perform all of these steps prior to presenting the page to the user after the user hits enter in the unified input field.

Figure 14:
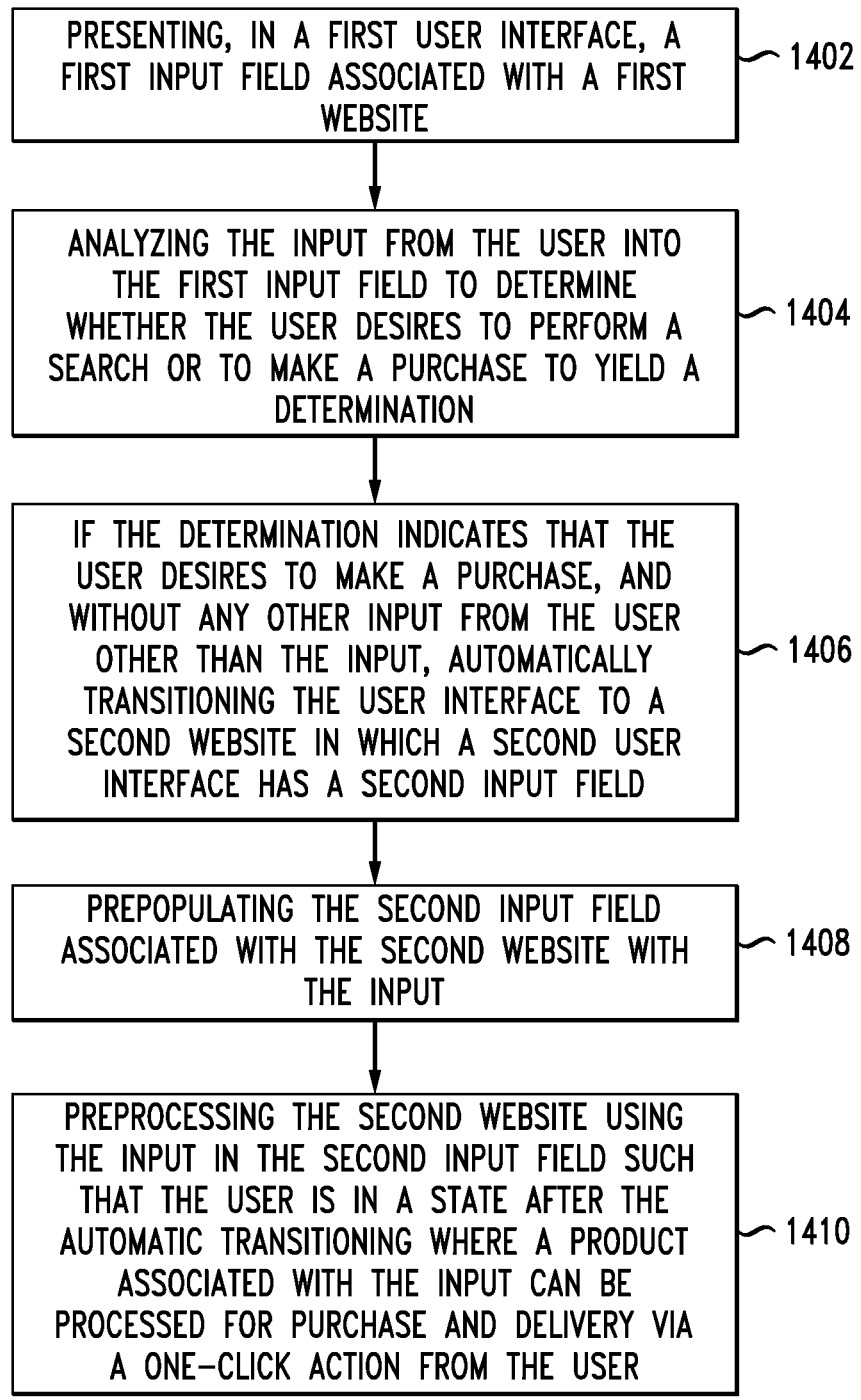
FIG. 14 illustrates an example method embodiment for operation of a search application programming interface (API)

FIG. 14 illustrates a method embodiment. The steps in the method embodiment can be performed in any order, can be performed in other combinations or permutations that include additional steps or exclude all or part of some of the described steps. The system can present, in a first user interface, a first input field associated with a first website (1402). The system can analyze the input from the user into the first input field to determine whether the user desires to perform a search or to make a purchase to yield a determination (1404). The determination can indicate that a confidence level that the user desires to make a purchase has passed a threshold.

If the determination indicates that the user desires to make a purchase, and without any other input from the user other than the input, the system can automatically transition the user interface to a second website in which a second user interface has a second input field (1406). The system can prepopulate the second input field associated with the second website with the input (1408). The system can preprocess the second website using the input in the second input field such that the user is in a state after the automatic transitioning where a product associated with the input can be processed for purchase and delivery via a one-click action from the user (1410). The system can, for example, transmit user data from one of the first website and a browser to the second website, or automatically navigate through a shopping cart model of the second website to yield the state where the product can be processed for purchase and delivery via the one-click action. The system can automatically transition the user interface to the second website by replacing the first website in the uniform resource locator field of a browser with the second website in the uniform resource locator field of the browser. The system can further prepare a third website having a third input field preprocessed using the input, wherein the user can provide a switching input to indicate that the third website should be presented rather than the second website. In another example, the first site can process a payment for the item and coordinate with the second site to provide the necessary information for delivery of the item.

Figure 15:
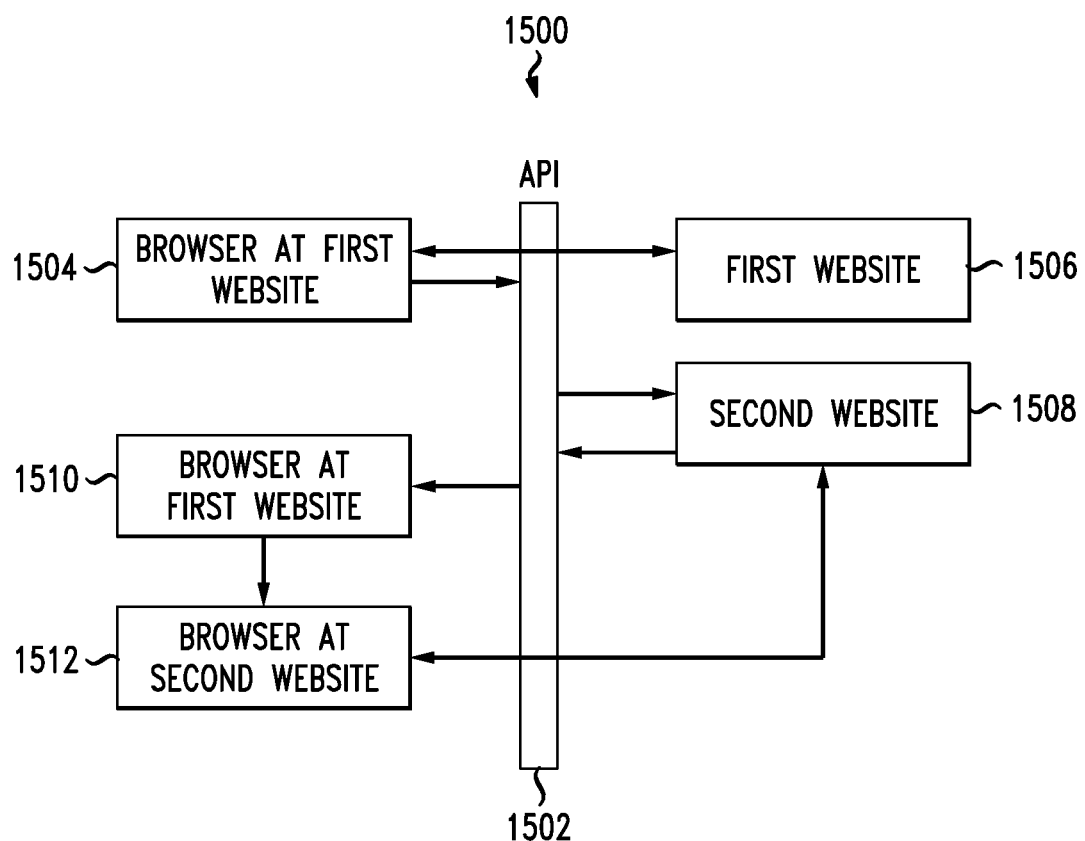
FIG. 15 illustrates communications via an application programming interface (API)

FIG. 15 illustrates an example scenario 1500 showing communications via an application programming interface (API) 1502. A one-search server, a web server, or some other computing device or computing devices can provide services accessible via the API 1502. The services provided by the API 1502 can be accessible from a web server serving pages to web browsers or other web clients, or from a web browser, such as through a JavaScript call to the API 1502. In this example, a browser navigates to a first website 1504, and retrieves the data for the first website, such as HTML, CSS, JavaScript, images, metadata, or other data, from a first website server 1506 without relying on the API 1502. Then, when the browser parses the data for the first website 1504, renders the page, and loads scripts or other executable instructions for the website, one or more portions of the data are linked to or reference the API 1502. For example, the attributes or instructions associated with a text field can instruct the browser to request search data via the API 1502. The API 1502 handles the complexity of how to handle the request so that the browser 1504 does not necessarily know or care which server is handling the request, how the data is processed to achieve a result, and so forth. From the perspective of the web browser 1504, data is submitted to the API 1502, and the API provides resulting data or performs a resulting action. In this case, the text field can instruct the browser to submit a request to the API 1502 based on text entered in the text field. Thus, as the user enters the text "buy iPhone 5S 64 gb," the browser 1504 that has loaded the first website can submit the text string to the API 1502 character by character, word by word, or at some time interval (such as 250 milliseconds). Further, as part of the page loading and rendering process, the browser 1504 can submit user data for the user or can establish, re-establish, or link to an existing session with the API 1502, so the API 1502 has sufficient context data about the user to make appropriate decisions. In response to receiving text from the web browser 1504, the API 1502 can analyze the data, determine a response of one or more action, web browsing destination, desired item to purchase, and so forth. Then the API 1502 can cull the list of one or more actions to an N best list, which can be based on the type of device or browser the user is using. For example, on a mobile device with limited screen space the N best list can be limited to 3 actions or destinations, while on a desktop or laptop computer with more ample screen space the N best list can be limited to 10 actions or destinations. As part of determining the best actions or destinations, the API 1502 can communicate with a second website 1508. If the action is a one-click purchase action with the second website 1508, the API 1502 can, on behalf of the user or the browser 1504, negotiate with the second website 1508 to navigate to the appropriate location at the second website 1508, populate the appropriate data fields automatically, create an account (if necessary) or log in to an account for the user, and so forth. The API 1502 can handle all of these tasks automatically in response to an API request, and pass that information back to the browser at the first website 1510, which presents these possible destinations or actions to the user. If the user selects the destination or action associated with the second website, the browser can then directly continue the session with the second website 1508 that the API 1502 created or modified. In this way, the API 1502 can coordinate between websites and automatically enter user data in response to API calls and pre-navigate to various actions or destinations on behalf of the user so they are ready for the user to select and open.

An example method of applying the use of the API is as follows. A method includes presenting an input field on a user interface, wherein the input field is associated with processing data using a generalized search engine that indexes and searches both merchant websites and non-merchant websites, receiving input from a user in the input field to yield user input, and receiving an interaction associated with the user input indicating that the generalized search engine should process the user input. When the user input is determined to indicate a search intent, the method includes presenting a search result comprising a non-merchant website and receiving a search interaction associated with the non-merchant website and transitioning the user to the non-merchant website. When the user input is determined to indicate a purchase intent, the method includes receiving, via an application programming interface, data associated with item from a merchant site, the item being selected based on the user input, presenting a purchase-related search result comprising a buy now option associated with the item, receiving a user interaction associated with the buy now option and, based on the user interaction, processing a payment for the item via stored payment information for the user at the generalized search engine to yield purchasing data. The method can then include communicating the purchasing data via the application programming interface to the merchant site, whereby the merchant site can manage delivery of the item to the user.

It is also noted that while FIG. 15 illustrates websites communicating via an API, that the API could also enable communication between two applications on a device, or could cause communication between a website and an application on a device. The API is meant to be the means of two different entities, each of which have different purposes or means of interfacing with users, such that coordination between the two entities can be facilitated.

Modified Browser Interface

A system, method and computer-readable storage devices are disclosed which prepopulate tabs based on intent determined by a classifier that processes input provided to the unified input field. In a typical web search, a user clicks to select a search field, enters text, waits for the results page to load, clicks a desired link in the results page, and finally arrives at the desired link after waiting for it to load. This process requires many steps. A unified input field that prepopulates tabs in the browser can simplify this process.

For example, one-search.com can provide a unified input field. The user provides input via the unified input field, such as a search for "iPhone 5S." The system can identify, based on a user profile and on the entered text, the n most likely desired pages, such as from a listing of search results if the user were to execute a search using the text entered to that point. The system can then instruct the user's browser to create and populate new tabs in the browser with the n most likely desired pages. The value for n may vary based on user preferences, already open tabs, how many pages exceed a confidence threshold, available memory, network bandwidth, which pages are ready to be loaded, diversity within the pages to be populated in the tabs, and so forth. In one variation, the system can automatically create and populate three new tabs in the browser, each with a different likely desired result in response to the input provided via the unified input field. One tab can be an Amazon one-click purchase page, one tab can be the final page of a populated shopping cart at Apple.com, and one tab can be the final page of a service contract for purchasing the iPhone 5S with a 2 year service contract through AT&T. In this way, the user can automatically select, browse, and compare the tabs to determine which one he or she desires. At this stage, however, the input data does not necessarily provide sufficient information to lead to a specific purchase. Thus, the system can select pages like an Apple information page about the iPhone 5S, a Wikipedia page about the iPhone 5S, or a popular video review of the iPhone 5S.

However, if the user enters additional information, such as "iPhone 5S 32 GB Silver," then the classifier can determine, based on the text and in conjunction with a user profile or search history, that the user's intent is to purchase the indicated iPhone. In this situation, the system can load purchase-specific tabs in the browser. For example, the system can load tabs directly to an Amazon.com or Apple.com page as if the user had already navigated there, selected the iPhone 5S, 32 GB, silver, added the iPhone to the cart, and was at an advanced stage or potentially the final stage in the check-out process. In the case of Amazon.com, the system could load a tab that is ready for the user to make a one-click purchase of the indicated iPhone. Alternatively, the system can load a tab that automatically performs the actions of clicking the one-click purchase button, so that the user can go to one-search.com, enter the text in the unified input field, and hit enter to purchase through Amazon, and the resulting purchase page is loaded in a new tab automatically for the user. In this case, hitting enter after entering the text in the unified input field could cause a new tab to be loaded with a purchase summary of the just-executed order, potentially allowing the user to modify shipping options, product options, billing information, or other order details. In another variation, the system can place the order automatically based on the user hitting enter in the unified input field, and transition the user to a new tab of a webpage for purchasing accessories, service related to the item purchased, technical support pages, or some other related web resource.

When the user enters a first partial input string in the unified input field, the user may click back and forth between one or more tabs to preview the results. Then the user can go back to the tab with the unified input field, and modify or add to the input string. The system can remove the previously generated tabs and populate new ones, or the system can keep the tabs that the user has opened, looked at, manipulated, or clicked on, for example, while eliminating the other previously generated tabs. In this way, the user can select which tabs to keep and which tabs the system is free to remove or replace based on the updated input string.

The system can predictively retrieve and cache potential matching pages for inserting into new tabs based on what the user is typing. For example, if the user is typing "Apple" in the unified search field, the system can retrieve pages of the three most popular Apple products or the three Apple products in which the user is most likely to be interested. Then, as the user types "Apple iP", the system can narrow the search to products that match the partial string, such as Apple iPods, iPhones, and iPads. Items such as the MacBook Air or the Apple TV would not be included, as they do not match the partial input string in the unified input field. The process can continue refining the cached pages, thereby saving time so the pages are ready to present to the user when a certain event occurs or a threshold is met. For example, in one variation, the system can wait for the user to press enter in the unified input field to populate the new tabs, even though the system is preparing, retrieving, and caching pages in advance of the user pressing enter. In this way, when the user presses enter in the unified search field, the system can very quickly create new tabs and populate the new tabs with the retrieved pages. If any additional pages have not been predicted or retrieved, tabs for those pages can load normally, while others are ready for the user to view.

In one variation, the system can immediately transition the user from the tab displaying the unified input field to a different tab that is created in response to input provided via the unified input field. While most browsers allow the user to a mouse to click on the tab, or press a keyboard shortcut such as ctrl-tab, ctrl-shift-tab, ctrl-pgup, or ctrl-pgdn to navigate between tabs, the unified input field can allow the user to press enter or some other key at the end of providing input via the unified input field to automatically switch to a newly created tab populated in response to the input. For example, the system can switch to a tab of a one-click purchase page on Amazon when the user hits enter in the unified input field. The system could also include the purchase in the transition action, so that the purchase is completed at Amazon based on the user pressing enter in the unified input field as well as switching the user to that new tab.

The system can present different options or different destinations based on user input. For example, the system can present a message or indication that pressing "enter" once would transition the user to a first new tab, while pressing "enter" twice would automatically transition the user to a second new tab, and pressing "enter" thrice would automatically transition the user to a third new tab, and so forth. Multiple different keys and/or key combinations provided via the unified input field can trigger different behaviors for managing or navigating tabs based on the input provided in the unified input field. Further, the various actions and key combinations triggering those actions can change as the user enters additional text in the unified input field, or modifies text in the unified input field.

Figure 16:
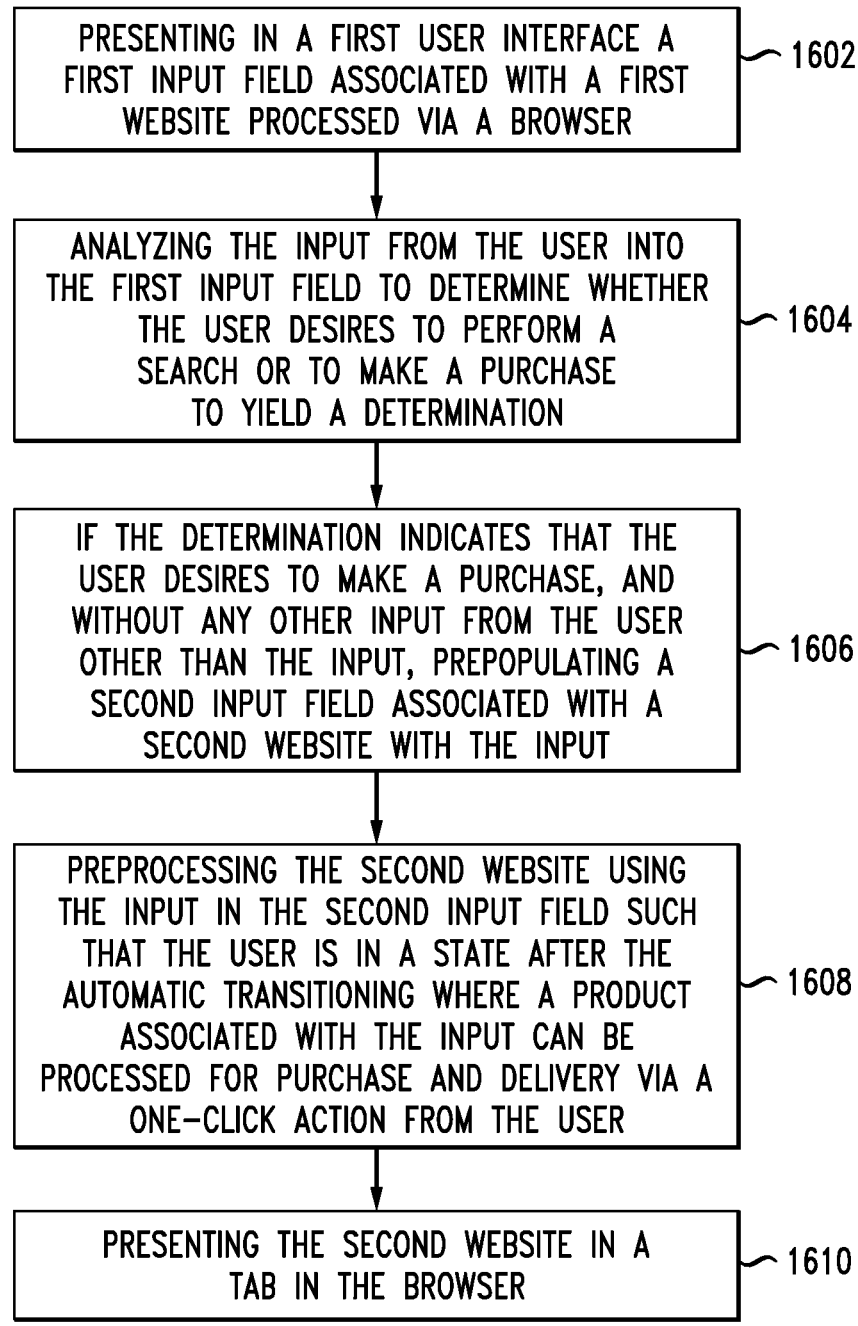
FIG. 16 illustrates an example method embodiment for an example modified browser interface.

FIG. 16 illustrates a method embodiment. The steps in the method embodiment can be performed in any order, can be performed in other combinations or permutations that include additional steps or exclude all or part of some of the described steps. The system can present in a first user interface a first input field associated with a first website processed via a browser (1602).

The system can analyze the input from the user into the first input field to determine whether the user desires to perform a search or to make a purchase to yield a determination (1604). If the determination indicates that the user desires to make a purchase, and without any other input from the user other than the input, the system can prepopulate a second input field associated with a second website with the input (1606). The system can preprocess the second website using the input in the second input field such that the user is in a state after the automatic transitioning where a product associated with the input can be processed for purchase and delivery via a one-click action from the user (1608). The system can preprocess the second website by transmitting user data from one of the first website and a browser to the second website. The system can preprocess the second website by automatically navigating through a shopping cart model of the second website to yield the state where the product can be processed for purchase and delivery via the one-click action. The processing can include that when the user interacts with the interface to make a purchase, the entity associated with the input field processes a payment of an item and coordinates with a separate merchant for delivery.

The system can present the second website in a tab in the browser (1610). The system can present a visual notification to the user associated with the tab that clicking on that tab will present to the user the second website in the state in which the user can process for purchase and delivery the product via the one-click action. The visual notification can be a popup, an indication on the first website, a browser-specific notification associated with the tab, or in some other location in the user interface. The system can present multiple additional websites in additional tabs in the browser, and can provide a mechanism, via the unified input field, to manipulate or navigate through those tabs independently of the established keyboard shortcuts and mouse clicks inherent in the browser. For example, the system can preprocess a third website using the input in a third input field such that the user is in a state after the automatic transitioning where a product associated with the input can be processed for purchase and delivery via a one-click action from the user, and presenting the third website in a second tab in the browser.

Figure 17A:
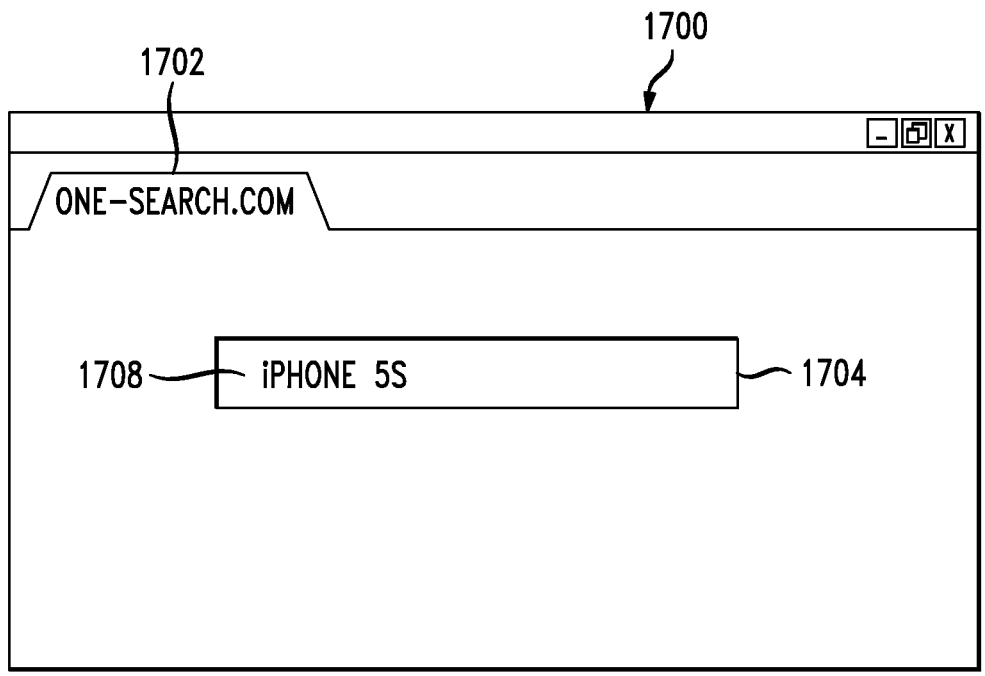
FIG. 17A illustrates an example browser interface.
Figure 17B:
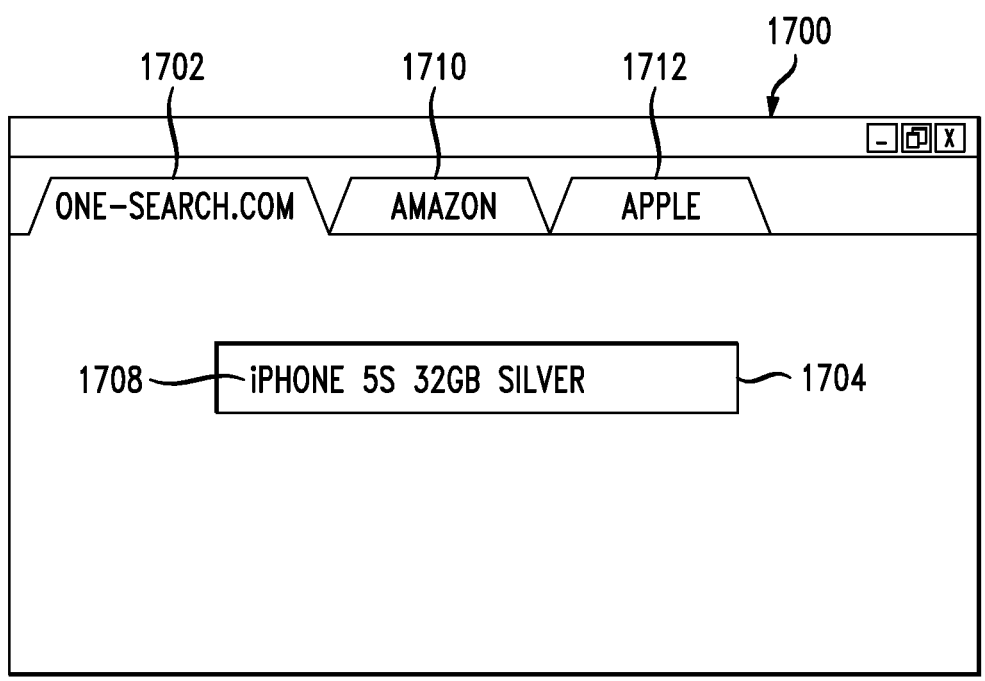
FIG. 17B illustrates an example interface with prepopulated tabs.

FIG. 17A illustrates an interface 1700 having a tab 1702 with an input field 1704 and user input 1706. This input field 1704 is open ended or open loop in that it does not automatically process the user input as a search but can process the input to perform a number of different functions. Assume the user inputs "iPhone 5S." The system analyzes that input and determines that there is a high likelihood that the user desires to make a purchase. The system then preprocesses that input on one or more website, such as Amazon.com and Apple.com, such that each of these alternate websites are positioned in a state which is the equivalent of the user having navigated to that website, and entered "iPhone 5S" and continued to browse and navigate to a state in which one more click causes a purchase and delivery of the product. Thus, in FIG. 17B, the system can present a tab 1710 for Amazon and a tab 1712 for Apple. The user can continue to type further text such as "32 GB Silver" 1708. The system continues to refine the preprocessing of the alternate websites. Thus, after the user is done, if the user clicks on the Amazon tab 1710, that tab will reveal a preprocessed search in a "one-click" state such that the next click can enable the user to buy and have delivered that product. Where websites like Apple don't have a similar "one-click" option, the system can navigate and preprocess a shopping cart model to essentially cause the tab 1712 to present the shopping cart, ready in a state where the user just needs one more click to make the purchase. The browser or one-search.com application can, via an API communicating with the alternate website, provide the purchasing account data, delivery address, passwords, etc. necessary to navigate in the background through the purchasing pages of a website that does not have one-click purchasing capability. The API may only need to communicate necessary data for completing a transaction if one-search.com handles the processing of the payment for the item. In this manner, merchants can easily communicate with one-search.com through the API for delivery.

The positioning of the tabs can be based on history, personal preferences, likelihood of intent, and so forth. For example, if the user typically purchases items through Amazon.com, then that tab will be presented 1710 next to the current tab 1702. The probability of a search intent over a purchasing intent may be equivalent, and thus a Google or Yahoo! Search may be presented in tabs next to a purchasing option. The tabs may also give hints as to how deep the preprocessing went. For example, one tab may say "Amazon search" and another may say "Amazon one-click" indicating to the user, that clicking on the Amazon search tab means that the "state" of that tab is that the user input has been preprocessed such that, as in a normal Amazon search, a list of items is returned for browsing but that the state is not a "one-click" state in which the user could do just one more click to complete a purchase and delivery. The depth of the preprocessing can also be performed based on how much disambiguation is needed. If the user does not provide enough data, then only search-level states may be provided. If there are only two options such as two colors to choose from on an item, and the user did not specify a color, the system could present in a tab, two different items, each having a "one-click" purchasing button, such that the tab is still in a one-click purchasing state, but two items are presented on the page such that no further navigation is necessary. The system could present a gold "one-click" option and a silver "one-click" option for purchase.

In a typical web search, a user clicks to select a search field, enters text, waits for the results page to load, clicks a desired link in the results page, and finally arrives at the desired link after waiting for it to load. If the user desires to continue and make a purchase, then the user must either log in with an existing account or create a new account with the website, place the item in a virtual shopping cart, check out, provide shipping information, and so forth. This process requires many steps. A unified input field that prepopulates a shopping cart for the user can greatly simplify this process.

Pre-Populating a Merchant Shopping Cart

A system, method and computer-readable storage devices are disclosed which prepopulate a shopping cart in an online vendor's website based on intent determined by a classifier that processes input provided to the unified input field. A user can be registered with and/or logged in with his or her browser, such as Chrome, Firefox, Internet Explorer, or Opera, such that user's purchasing credit/debit card or other accounts and delivery addresses are stored in a user profile. Then, if the user desires to make a purchase through a destination website that may have a product not found on their registered website, the browser (or system processing in a network) can handle negotiation between the browser and the website such that the system can convert a shopping-cart based model website with which the user is not registered into a "one-click" purchasing experience for the user. For example, the system can handle the payment for the item and communicate with the merchant site to handle delivery.

Assuming that appropriate permissions are in place, such as in a browser setting authorizing the browser to navigate and provide input in a website's purchasing, registration, or shopping cart process to automatically input name, address, credit card information, etc., the system can automatically populate a shopping cart, including even registering on behalf of the user at a website with which the user has not registered. The user provides input in a unified input field, such as "buy acme toaster 4.5" which the system and the classifier categorize as a desire to make a purchase of a particular toaster model. The system determines, based on various criteria such as pricing, shipping, country, and so forth, a merchant website that offers that toaster model. The user has never registered or made a purchase at the merchant website offering the toaster for sale. Thus, if the user were to buy the toaster from that merchant website, the user would have to place the toaster in a virtual shopping cart, then enter personal information such as address, credit/debit card information, user name, password, and so forth to have the item shipped.

In this model, the system can identify the merchant website based on the input provided via the unified input field. Then the system can navigate to the state in the merchant website where the user would normally click to place the item in the shopping cart. In this case, however, the system will navigate the merchant website where the item can be placed in the shopping cart, and determine that the user is not registered with this merchant website. Then the system can automatically communicate with the merchant website, such as via a new user registration page, to create a new account on behalf of the user using the user data available to the system and/or to the browser. Thus, the system can present to the user just the confirmation in a button to purchase via one click. The confirmation can be a double confirmation of authorization to create a new account and authorization to then place the order using the new account. The user can automatically authorize new registrations and can establish settings or preferences governing new profile registrations. The system can then enter all the necessary data, retrieved from the browser or some other location, to complete the registration and cause the item to be purchased and shipped without the need of further user input. This approach can turn non-one-click purchasing websites into one-click purchasing websites, via input through the unified input field. The system can also use the registered payment information to process the payment as well and coordinate with the merchant site for filling the order.

The system can process the new registration pages silently, such as in a background tab or new window in the browser, or can negotiate the new registration process with the merchant website without presenting the registration page to the user at all. The system can present a progress bar on the same page containing the unified input field after the user requests a purchase, such as by pressing enter after providing input via the unified input field. The progress bar can indicate to the user the progress of creating a new account, entering shipping data, adding the item to the cart of the merchant website, and placing the order.

The user can establish default preferences for which personal information to use for new registrations. The user can establish these default preferences in advance of encountering the merchant website, or even in advance of encountering the unified input field. Alternatively, at the first instance where a registration is required, the system can prompt the user to establish such settings and/or provide additional information.

The system can prefer merchant websites with which the user already has an account or with which the user is already registered. For example, if Merchant X and Merchant Y both offer the same item for sale, the system can choose to use the one of these two merchants where the user already has an account. The system can determine this by examining a browser history, profile data available to the browser, or cookies stored by the browser or by other browsers associated with the user. The system can intelligently determine when to use a merchant with which the user is not registered, such as based on a difference in shipping time, or a difference in price. For example, if the merchant with whom the user is not registered offers the desired item at a price that is at least 25% lower than the merchant with whom the user is registered, then the system can create a new account. If the user does not desire to have the system create user accounts on his or her behalf, the user can instruct the system to make purchases where he or she already has accounts, or at merchant websites which allow guest accounts.

However, the system can identify, using the classifier and user profile data, the merchants the user is most likely to select, and present them to the user for disambiguation. The system can present to the user a table, such as by a JavaScript popup, showing merchants, shipping times, and total price including shipping and tax. The user can simply click on a desired merchant from the table, and the system can automatically register the user with that merchant if necessary, and process the order with that merchant. The user only has to make one click to identify the merchant, and the system handles the rest of the steps, thereby providing a one-click interface into a non-one-click website via the unified input field.

Figure 18:
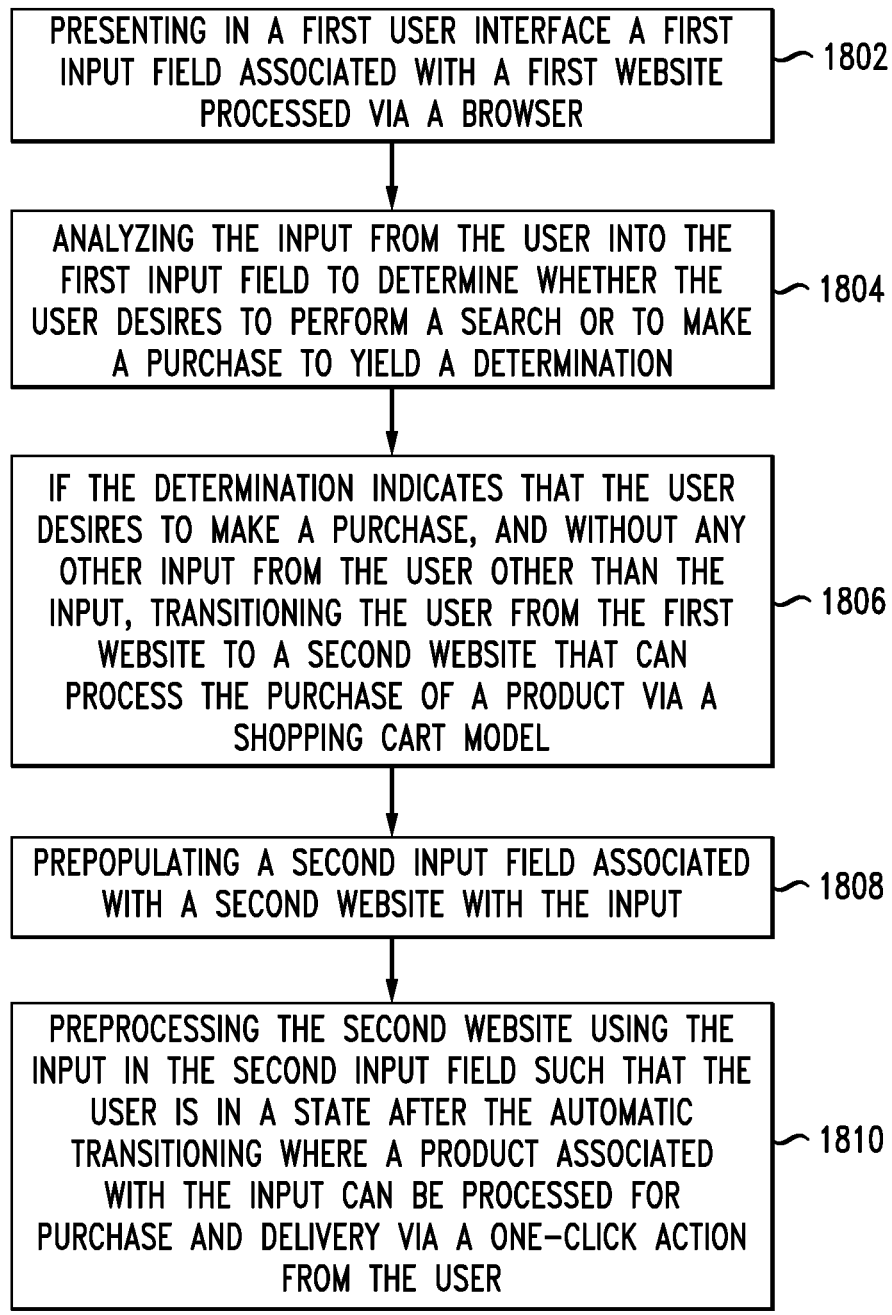
FIG. 18 illustrates an example method embodiment relating to pre-populating a merchant shopping cart.

FIG. 18 illustrates a method embodiment. The steps in the method embodiment can be performed in any order, can be performed in other combinations or permutations that include additional steps or exclude all or part of some of the described steps. The system can present in a first user interface a first input field associated with a first website processed via a browser (1802), and analyze the input from the user into the first input field to determine whether the user desires to perform a search or to make a purchase to yield a determination (1804). If the determination indicates that the user desires to make a purchase, and without any other input from the user other than the input, the system can transition the user from the first website to a second website that can process the purchase of a product via a shopping cart model (1806). The system can prepopulate a second input field associated with a second website with the input (1808).

The system can preprocess the second website using the input in the second input field such that the user is in a state after the automatic transitioning where a product associated with the input can be processed for purchase and delivery via a one-click action from the user (1810). Preprocessing the second website can include transmitting user data from one of the first website and a browser to the second website, or automatically navigating through the shopping cart model of the second website to yield the state where the product can be processed for purchase and delivery via the one-click action. The system can further preprocess a third website using the input in a third input field such that the user is in a state after the automatic transitioning where a product associated with the input can be processed for purchase and delivery via a one-click action from the user, and present the third website as an option for the user to choose in the browser.

The preprocessing can be according to a user profile with various preferences. For example, in a user profile associated with the first website, or with a browser. The user profile can utilize information such as payment account data, delivery data, preferences such as not to click on receiving any email notifications, and any other possible choices that can be made in processing a shopping cart model. The application, browser, or website, via an API, can then communicate in the background can perform all of those navigations and input necessary so that such input can be automatically handled to the extent that the user is presented with the second website in a state where they are ready to "one-click" and make the final purchase and delivery. The API can include all of the information necessary for the second website that is necessary the fill in and enter all of the necessary data to finalize the purchase. For example, the first site can process a payment and the second site can finalize the order by filling it and handling delivery. The first website or browser or application can hold all possible information that various shopping cart models can and do request in processing the purchase. As a particular second website is chosen as the one to which or through which the user is likely to make a purchase from. The first website or browser establishes via an API a connection to the second website with the various information necessary for preprocessing the input. The data such as the user input identifying the product that they want to buy and any other generated data that helps to narrow down and disambiguate which product to present for purchase via a one-click input. For example, the user may input "iPhone 5S 32 GB" but not a color. The system can choose a most popular color and provide that data to the second website to enable a narrowing down of which model to present. The system can also present secondary options such that alternate choices can be easily made accessible via the second website for potential selection if the primary choice is the wrong color or is not the desired product to buy.

Figure 19:
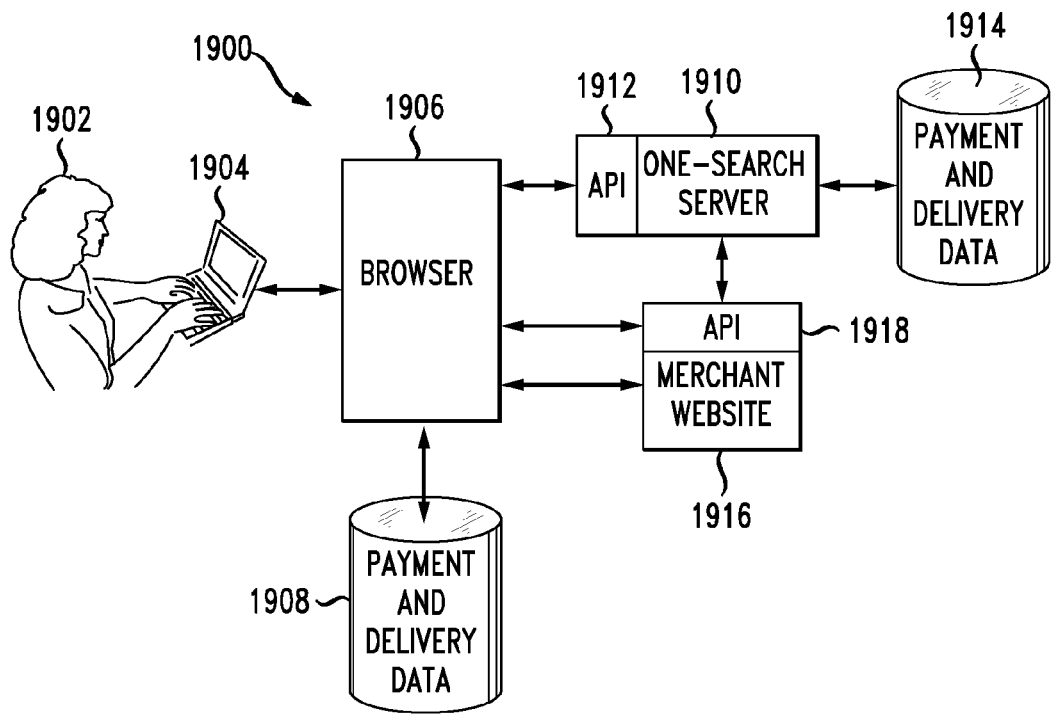
FIG. 19 illustrates an example architecture for pre-populating a merchant shopping cart.

FIG. 19 illustrates an example architecture 1900 for prepopulating a merchant shopping cart. In this example, a user 1902 of a computing device 1904 running a web browser 1906 loads a web page with a unified input field. The unified input field communicates with a server 1910 via an API 1912. As the user 1902 enters data in the unified input field, the browser 1906 sends the data, via the API 1912, to the server 1910. The server 1910 can analyze the data to identify that the intent of the user 1902 is to make a purchase, based on the data entered in the unified input field. The server 1910 can identify a merchant website 1916 that sells the desired item, and communicate with that merchant website 1916 via its associated API 1918, if available. If an API is not available, the server 1910 can communicate with the merchant website 1916 via HTTP and can navigate through the website in an automated fashion as if a user were clicking or entering data on the merchant website 1916. The server 1910 can use a network-based database 1914 of payment and delivery data or other personal data about the user 1902 to populate data fields at the merchant website 1916. However, if a network-based database 1914 is incomplete or does not exist, the server 1910 can, via the API 1912, request data from a database of payment and delivery data 1908 local to the browser 1906 or to the computing device 1904. The server 1910 can continuously receive additional data entered by the user in the unified input field via, and update or modify data entered at the merchant website 1916, products selected for purchase at the merchant website 1916, or even switch to a different merchant website altogether. The server 1910 can transmit a response to the browser 1906, via the API 1912, so the browser 1906 can present actions or destinations to the user 1902 based on the data entered in the unified input field. Then, if the user selects one of the actions or destinations, the browser 1906 can navigate to that page and communicate with the merchant website 1916 directly, or without the server 1910, although the server 1910 may continue to communicate with the browser 1906 to track behavior of the user 1902 at the merchant website 1916. For instance, the server 1910 may track eventual purchase details referred through the unified input field. The server 1910 can update the network-based payment and delivery data 1914 from time to time based on information processed from the local payment and delivery data 1908, or based on user input.

Figure 20:
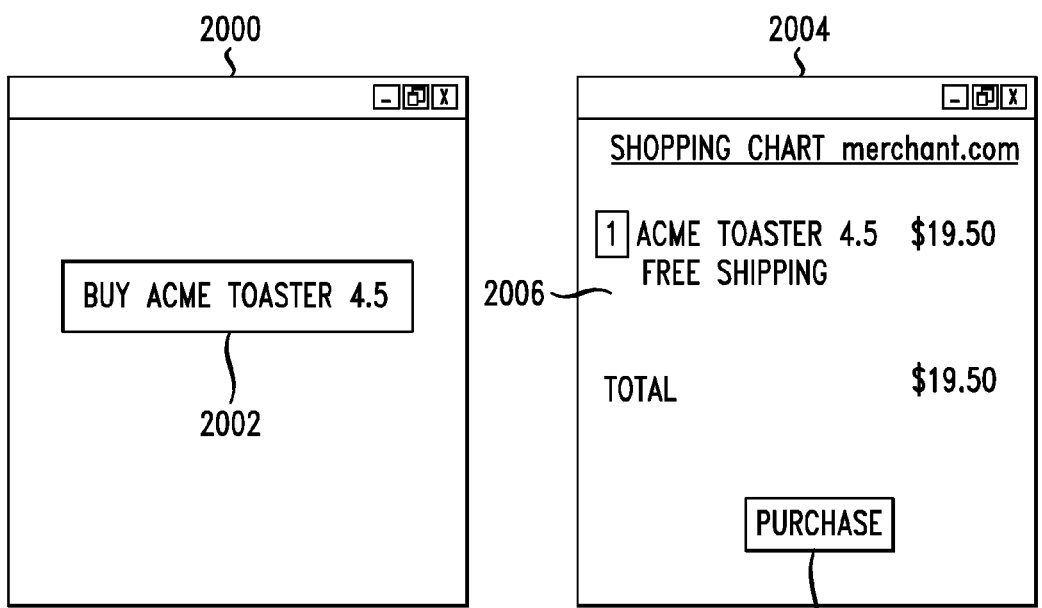
FIG. 20 illustrates example user interfaces for a pre-populated merchant shopping cart.

FIG. 20 illustrates example user interfaces for a pre-populated merchant shopping cart. In the first user interface 2000, the user has entered the text "Buy ACME toaster 4.5" in the unified input field 2002 of a web page in a browser. After hitting enter or clicking a search button, the browser communicates with a server that has already navigated to (or is currently in the process of navigating to) a merchant website to populate the shopping cart at the merchant website with the desired toaster. The server can hand off that browsing session to the browser to continue at a specific point in the checkout or shopping cart process, or can return a URL to the browser that is formed to go directly to a shopping cart that is populated based on the text entered in the unified input field. In this case, after hitting enter or clicking a search button, the browser navigates directly and automatically to a merchant website 2004 listing the item already placed in the shopping cart, order details, and a one-click purchase button 2008. Alternatively, the browser can navigate to a stage where the order has already been placed, such as the page that would load after the user clicks the purchase button 2008. The system can populate other details of the shopping cart automatically on behalf of the user, as well. The system can even create a new account at the merchant on behalf of the user, if the user does not have an account with that merchant. In this way, the system enables a user to access websites, through a unified search field, as if they were one-click purchase merchant websites, even if the user has not previously registered with that merchant or if the merchant does not offer an "Amazon style" one-click purchase interface. For example, the first website entity associated with offering the generalized input field can process the payment for an item based on payment account information it stores and coordinate with the merchant on finalizing delivery of the item.

Determining Whether User Input is a Generalized Non-Purchasing Query or a Query with Intent to Purchase A system, method and computer-readable storage devices are disclosed which enable any input field in a website or in some other computer-based user interface to act as a unified input field. A unified input field allows a user to provide input that can lead not only to a listing of search results, but can cause any of a number of other actions to be performed on behalf of the user, such as directly navigating to a merchant shopping cart prepopulated with a desired item, or even automatically executing a purchase and placing an order for a desired item. Using such a unified input field can save significant time, effort, and clicks for a user. However, such unified input fields may not be implemented in every website or other user interface the user desires. The user may become accustomed to a particular workflow or set of capabilities when dealing with unified input fields, and may feel restricted or limited when using a traditional limited input field.

In one embodiment, if the user is directed from a unified input field enabled site such as one-search.com to Apple.com, then that user's interaction with Apple.com could be modified such that the search field of Apple.com (or any website, such as Google.com or Amazon.com) becomes like a one-search.com unified input field. For example, a JavaScript script or browser plugin can intercept text entered into text fields on non-unified input field enabled sites or non-unified input fields, and redirect that input to one-search.com to implement these features and present the autocomplete options, and the one-click purchase options. In other words, the options to do any number of different processing options outside of the particular website can be made available to the user. In this manner, any search field, text field, or input field can be adapted to be a unified input field as disclosed herein. Of course, all of the functionality disclosed herein could be built into any search or input field on any website, application, or user interface.

Functionality of the browser can be modified directly or via a plug-in, script, or extension, to implement a unified input field in place of an existing input field. The user can activate the input field enhancer, such as by checking a checkbox in a menu, clicking a button, logging in with a username and password, or providing some other user identifying credentials. The input field enhancer can then identify the user, and retrieve personal data about the user, such as a profile stored in a browser cache or a profile stored on a server. The system can identify user preferences from the profile data, which may provide rules or preferences for when and how to modify certain input fields to be unified input fields. For example, a user profile may indicate not to modify input fields on craigslist.org, but to modify input fields everywhere else. Another user profile may indicate to modify all text input fields located within the top 10% of a website. Another user profile may indicate not to modify text input fields on mobile devices such as smartphones and tablets, but to modify text input fields on desktop or laptop computers. The user can log in to a user profile that is stored on a server, so that the user's preferences and other personal data are not limited to one local machine, but instead are accessible from any such enabled machine. Thus, the user can log in to a browser on a work computer to enable unified input fields and can do the same on a home computer, while using the same personal profile, preferences, and history. This personal information can be important for a classifier when determining intent based on a relatively short input string, and can provide a sense of consistency for the user when unified input fields behave similarly across multiple devices.

The enhancer can be triggered when a new page is loaded in the browser, or when the page is refreshed or updated, such as by an Ajax call that dynamically loads or modifies page elements. The enhancer can operate in conjunction with a rendering engine or web browser engine to identify input fields while rendering the page. In this variation, the enhancer can modify the code for a page as the page is being parsed and/or rendered. The enhancer can operate as a post-loading operation that goes back and revises an already loaded and rendered page. In either way, the enhancer modifies the functionality of an identified input field to capture and redirect the input to a local or remote server to provide similar or the same functionality as a unified input field. Then, the server can communicate with the browser to implement the various benefits and functionalities of the unified input field, such as presenting previews of one-click purchase actions as tears on the webpage, as new tabs or windows, expose such one-click purchase actions via the "search" button or some other button, and so forth.

The system can mark an input field or present some kind of visual or audible indication that the input field has been modified or enabled as a unified input field. For example, when the system detects a standard text input field, such as the search field at the top of ebay.com, the system can determine whether that standard text input field is suitable for repurposing as a unified input field. If the system makes a positive determination, then the system can modify the standard text input field's functionality as well as its appearance. For example, the system can render a different color border around the text field, or can make a noise when focus moves on to or in the text input field or when a mouse or text cursor enters the text field. The system can apply a change in size, font, appearance, or even introduce an animation highlighting the modified text field. User preferences can also dictate how the system highlights the modified text field.

Then, when the user enters text into the modified text field, the system can process the input via the classifier to determine an intent, and generate one or more actions which can be taken based on the intent. In some cases, if the classifier is unable to determine an intent above a certainty threshold, then the system may not present any actions based on the input, and may choose to wait for additional input which may change the intent and/or the certainty threshold. How the system determines to present the one-click actions based on the determined intent may vary based on the browser displaying the page, or the layout of the page hosting the modified text field. For example, if the text field has sufficient adjacent white space, the system can render one-click buttons proximate to the text field for performing the various actions. The system can present drop down menus with one-click actions as part of the browser, outside the rendered web page containing the modified text field. The system can use JavaScript to modify or rearrange certain page elements to temporarily or permanently (for the life the page as rendered) temporarily accommodate user interface elements for the one-click actions. The system can use JavaScript to overlay new user interface elements on top of the rendered page for providing access to the one-click actions. In one embodiment, the system presents user interface elements that look like "tears" that peek through the rendered page to show a portion of a page that appears to be beneath the rendered page.

However, even when a text field has been modified, the system can still preserve the original functionality of an input field, while extending the input field to also act as a unified input field. For example, the user can toggle between the modified functionality and the original functionality by pressing shift in the beginning of the input field. The system can also toggle the appearance of the modified input field to indicate to which function of the modified input field the user is directing input.

The system can identify text fields which are candidates to be modified, but can leave them untouched until receiving some user command or input requesting the unified input field functionality. For example, the system can provide access to unified input field functionality, upon the user activating or requesting the functionality by pressing a key or key combination, or double clicking in the input field. The user can, in this manner, toggle between different functionalities for the input field. This can be beneficial to avoid breaking some websites that rely on specific functionality of the input field. However, the system can overlay the unified input functionality over the existing, original functionality of the input field, without hindering its operation. For example, the system can implement the unified input field one-click actions in a different region of the user interface, while allowing the original functionality to proceed unchanged. Or the system can incorporate the original functionality as one of the one-click actions presented via the unified input functionality. For example, if the user entered the text "iPhone 5C 32 GB yellow" in a modified input field on eBay.com, the system can generate a set of buttons overlaid on top of the page via JavaScript: a first one-click action button for purchasing the indicated iPhone 5C via Amazon.com, a second one-click action button for purchasing the indicated iPhone 5C via Apple.com, a third one-click action button for purchasing the indicated iPhone 5C via attwireless.com, and a fourth one-click action button for implementing the original input field functionality of executing a search of auctions on eBay.com.

The system can further adapt the functionality of the unified input field based on the detected type of browser or available space on the interface. For instance, the system can present a user interface that is consistent with the look and feel of the page hosting the modified input field. If the page hosting the modified input field has advertisements, the system can position the one-click action buttons or other user interface elements in such a way to avoid obscuring those advertisements. This setting can be dictated by code or settings in the page hosting the modified input field, such as a token or instruction intended to guide the behavior of a modified input field.

In one embodiment, a website can pre-modify an input field by making it unified input field aware. In cases when the website detects that the user does not participate in or use unified input fields, the input field can retain its original functionality. However, when the website detects that the user does participate in or uses unified input fields, such as by detecting a cookie in the user's browser, the website can preemptively modify or activate the unified input field to provide a more familiar interface for that user. The website can interact with a server for managing such unified input field requests via an established application programming interface (API).

Figure 21:
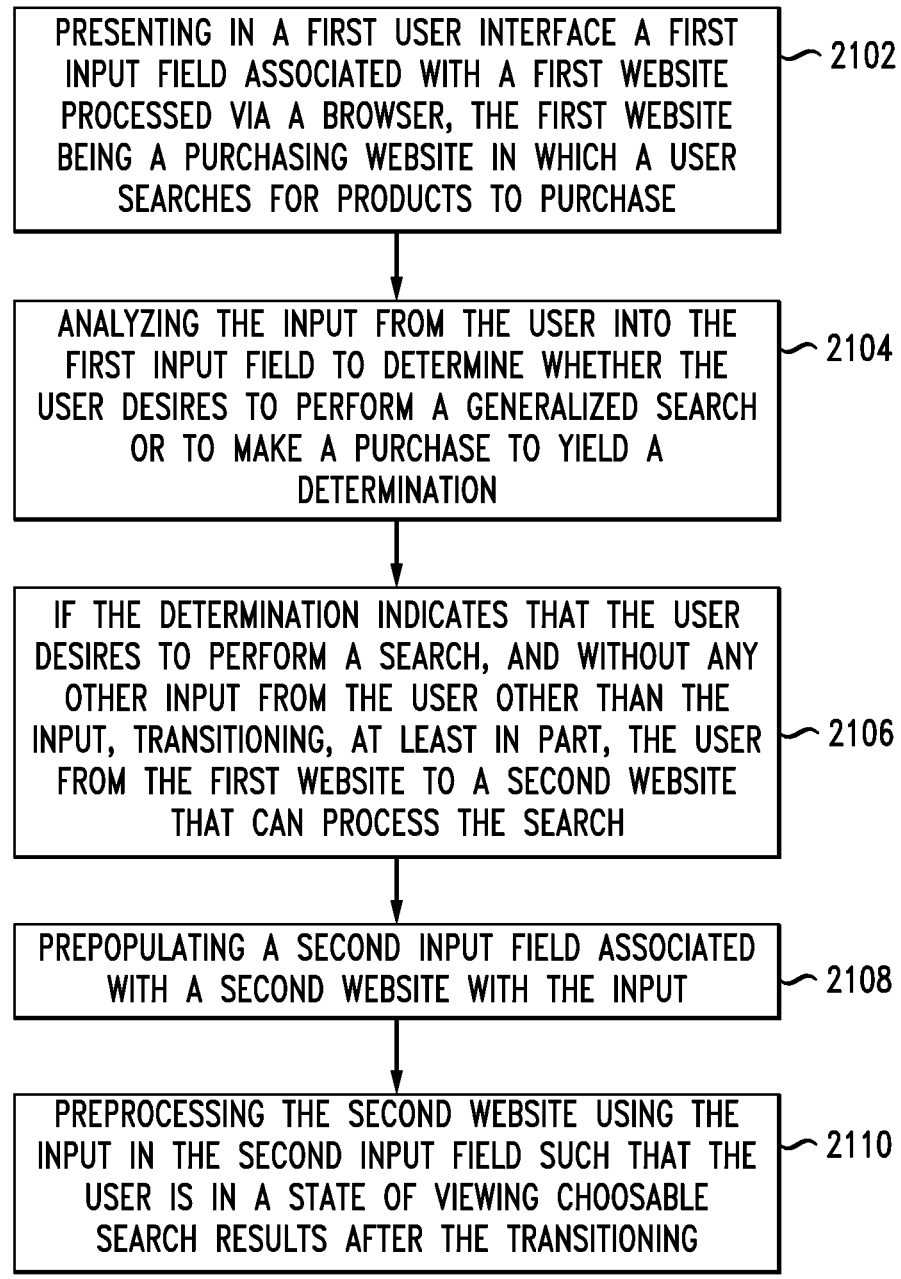
FIG. 21 illustrates a method embodiment for determining user intent as one of a generalized non-purchasing search or a search with intent to purchase.

FIG. 21 illustrates a method embodiment. The steps in the method embodiment can be performed in any order, can be performed in other combinations or permutations that include additional steps or exclude all or part of some of the described steps. The system can present in a first user interface a first input field associated with a first website processed via a browser, the first website being a purchasing website in which a user searches for products to purchase (2102). The system can analyze the input from the user into the first input field to determine whether the user desires to perform a generalized search or to make a purchase to yield a determination (2104). An example of a generalized search is one that a person might do on Google.com. For example, the user might search using the term "North Dakota." In that case, they are looking for information on that state. However, if the user is at the URL for Amazon.com, entering in "North Dakota" would not necessarily mean that they desire to make a real estate purchase of the entire state. That user input has a strong indication that they do not want to make a purchase but rather to perform a generalized search in contrast to searching for products to purchase on Amazon.com. If the determination indicates that the user desires to perform a search, and without any other input from the user other than the input, the system can transition, at least in part, the user from the first website to a second website that can process the search (2106). Transitioning the user from the first website to a second website can include presenting the second website via a tear in the first user interface revealing at least a portion of the second website. Then the user can provide an indication through the tear that the user desires to navigate to the second website, and based on the indication, the system can navigate the user to the second website. The system can select a position of the tear in the first website based on an analysis of a structure of the first website. The system can prepopulate a second input field associated with a second website with the input (2108), and can preprocess the second website using the input in the second input field such that the user is in a state of viewing selectable search results after the transitioning (2110).

Figure 22:
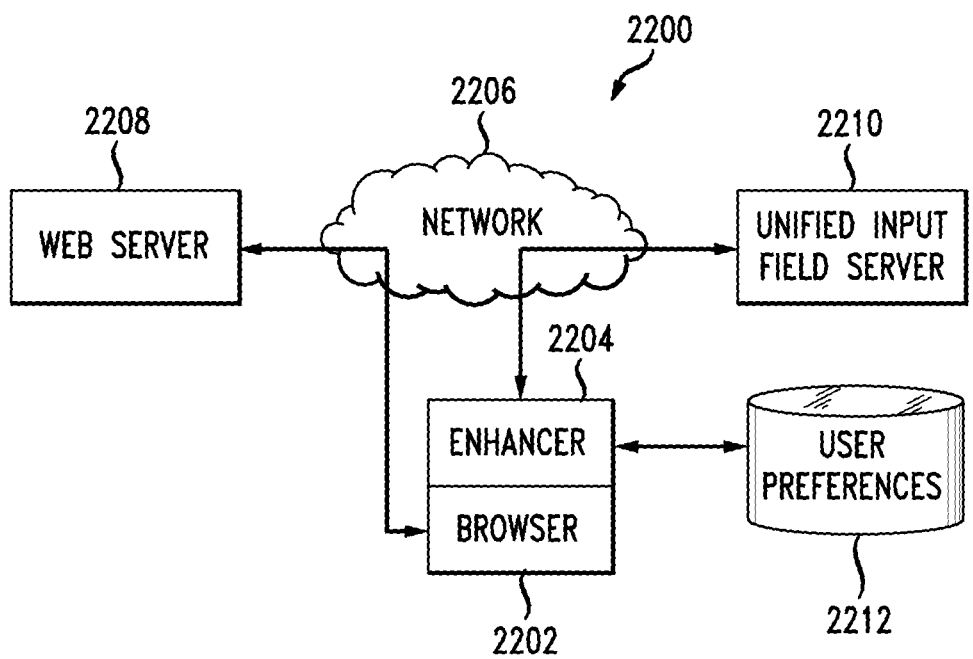
FIG. 22 illustrates some of the components that can be used with the method embodiment shown in FIG. 21.

FIG. 22 illustrates some of the basic components 2200 of this embodiment. An application like a browser 2202 or smartphone app can have an enhancer 2204 which is a module or a component that can communicate with a database of user preferences 2212 for helping to improve the processing of input via any input field. The browser 2202 can communicate via a network 2206 with a web server 2208 which serves up a website or application such as amazon.com. The browser and/or enhancer 2204 can also communicate with a unified input field server 2210 via a network 2206. This unified input field server 2210 can also communicate with the database of user preferences 2212 as instructed by the browser 2202 to tailor the processing of user input accordingly. Using this approach, the system can process and turn any input field served up from any web server 2208, into a unified input field by virtue of connecting the processing to the unified input field server 2210. In this manner, while the user may be on a website such as Amazon.com, which has input fields that typically expect items of purchase, and that input field can be turned into a more unified input field for jumping to other places and performing other functions as well. Thus, utilizes the connection to the unified input field server 2210, that amazon.com input field can become the jumping off point for a generalized search, a phone call, a Skype-type call, a video conference, or any other purpose which can be achieved through a more flexible and open input field processing approach as disclosed herein.

Searching Via an Application-Based Portal Rather than a Website

Figure 23:
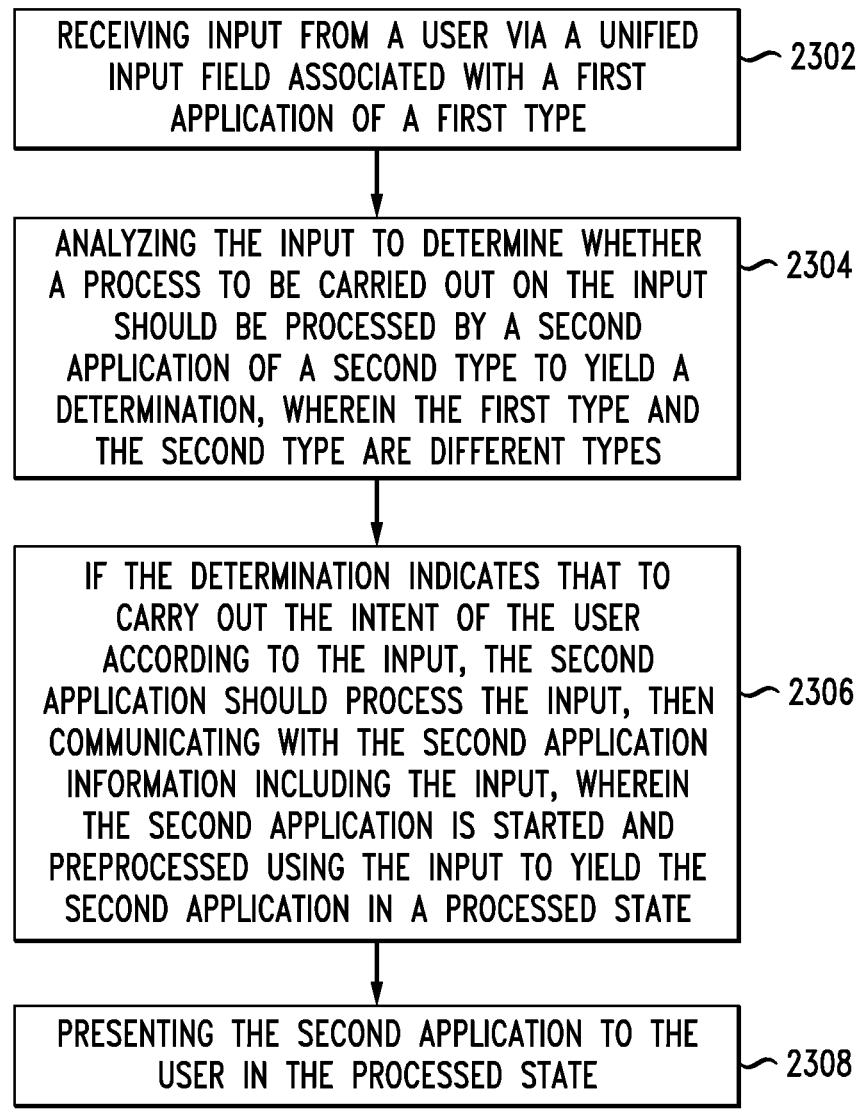
FIG. 23 illustrates a method embodiment for an application-based search portal instead of a search via a website.

FIG. 23 illustrates a method embodiment. This embodiment focuses more on applications communication one with another rather than websites. The basic concepts are similar, however. For example, a user having a tablet or a smartphone may have an application for performing searches. This is different from a browser on the device that enables the user to just to a search engine URL. The application, which again can be anything such as a search app, or a Skype or FaceTime app, a banking application, etc. Any application of a first type can have an input field. The point here is to turn that input field which traditionally is associated with a particular purpose of the application, into a more generalized input field that can process the input and determine whether the user should automatically be transitioned to another app. Switching between a browser and an application is also possible. For example, the user could be on a smartphone using a browser application with the URL positioned on www.google.com. The user, however, may enter in a product into the search field. The system (locally, on a server, or via processing using a combination of both) determines that the user desires to make a purchase based on the input. The system could automatically launch an Amazon.com application (rather than transitioning to amazon.com via the browser), pre-negotiate such that the input and the "state" of the amazon.com application is positioned using the input to either present search results as though the user had already launched the application and search, or could position the application in a "one-click" state where the user simply makes the purchase.

A method includes receiving input from a user via a unified input field associated with a first application of a first type (2302) and analyzing the input to determine whether a process to be carried out on the input should be processed by a second application of a second type to yield a determination, wherein the first type and the second type are different types (2304). If the determination indicates that to carry out the intent of the user according to the input, the second application should process the input, then the system communicates with the second application information including the input, wherein the second application is started and preprocessed using the input to yield the second application in a processed state (2306). Finally, the system presents the second application to the user in the processed state (2308).

The presenting occurs without any additional input from the user to navigate to the second application. Communicating with the second application can further include communicating at least one of the following to the second application: user identification information, payment account information, delivery address information, and user preferences. As noted above, the process can involve switching between browsers at particular websites to apps on a smartphone or tablet, or other device. An application in this case is generally known. It is a software product purchased or downloaded for free that performs typically a single general purpose like enabling purchases through Amazon, or handling video and audio calls like Skype. Such applications of course differ from the URL which can be associated with the same company but provide different mechanisms of accessing the services of that company.

The first application and the second application are one of smartphone applications and tablet applications. Again, in another aspect, this disclosure provides a description of switching between a URL (website) and an application. The system can automatically close the first application and start and present the second application in the processed state on a user interface. This enables the user to avoid the process of closing one app and manually launching the desired application. In one example, the first type is a search type and the second type is a product purchasing type. The first type can, for example, be a type not associated with purchasing products and the second type can be associated with purchasing products. This provides an example of switching between contexts, types, applications purpose and so forth, but while using a single input field. This approach reduces the interactions necessary for a user to get a function performed (search, purchase, delivery, call, etc.) because it eliminates the need to navigate to a separate URL or a separate application that performs the desired function. In example, the first application can process a payment for an item and coordinate with the second application for delivery of the item to a buyer.

Selecting a Transition Type Between Search Interfaces

Figure 24:
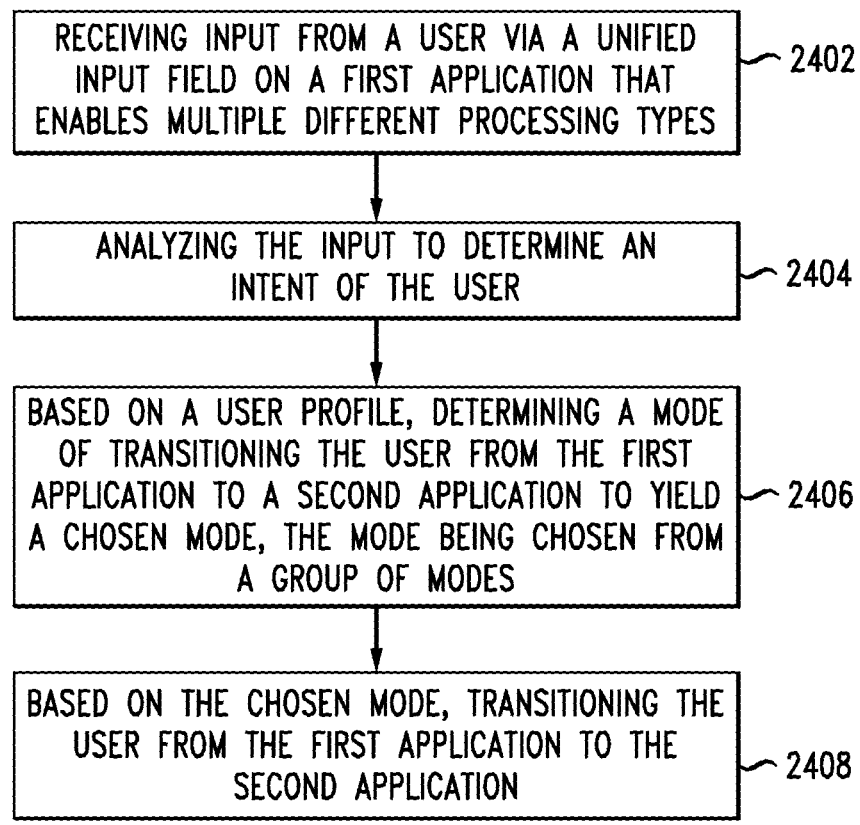
FIG. 24 illustrates a method embodiment for selecting a transition type between interfaces.

FIG. 24 illustrates a method embodiment. This embodiment focuses on choosing the mode of transitioning from one interface to another. A method includes receiving input from a user via a unified input field on a first application that enables multiple different processing types (2402) and analyzing the input to determine an intent of the user (2404). Based on a user profile, the method includes determining a mode of transitioning the user from the first application to a second application to yield a chosen mode (2406), the mode being chosen from a group of modes and, based on the chosen mode, transitioning the user from the first application to the second application (2408).

The first application can be one of a first website and a first smartphone/tablet application and the second application is one of a second website and a second smartphone/tablet application. The group of modes can include: a tear, an autochange, a search button morph, a drop up menu, a drop down menu, a processing indictor morph and multiple reduced size one-click enabled windows. A "tear" represents an opening in a first interface that makes it appear that the first interface is tearing open to reveal another interface below it. So if the first application was google.com, and the user entered a search term that was determined to indicate that the user desires to make a purchase, an opening or a tear in the white space of the google.com page could appear and through that opening would appear a portion of an amazon.com webpage, preprocessed with the search term, such that the user can click on the opening space and easily transition from google.com to amazon.com with the input field data also transitioning as well. This approach reduces the number of necessary clicks. The autochange feature automatically replaces the URL from google.com to amazon.com (or whatever the two different websites are) without user input such that when the system determines that a switch is needed, it automatically does it and perhaps further processing to place the destination website in a one-click purchasing state based on the user input. The search button (the button that indicates what process is performed if a user clicks "enter") can morph in its functionality based on the user input. A notification of the function to be processed can also morph as well. Drop up, drop down, extension menus can also be provided which not only do auto complete but also present one-click purchasing options, calling options, video conferencing options, etc. These various modes present alternate mechanisms of transitioning automatically to a new webpage, application or function. However, given that there are different ways of making such a transition, the user can present and store preferences of how to make that transition. Alternately, various options could be presented and user history, previous searching and internet or application usage or other factors outside of or in connection with the user profile could be used to make the decision of the chosen mode.

The "tear" open to another page can include a one-click option that the user can click to make a one-click purchase. The system can maintain that tear view of the other page on the search interface while executing additional searches, exploring other search results, or browsing to other websites. For example, the user can "pin" the tear in place so it remains available while the user conducts additional browsing activity. Thus, the user could hold the one-click-purchase tear while reviewing, studying, searching around the web, and the user can still use the tear to make a purchase later on.

Transitioning the user can include transitioning the user without the user navigating manually to the second application. Transitioning the user can be achieved through the user performing a single click action to initiate and complete the transitioning. Transitioning the user from the first application to the second application can further include preprocessing the second application using at least one of the input, user identification, user account information, user delivery information and user preferences, to yield the second application in a one-click purchasing state. For example, the first application can process the payment and coordinate necessary data to the second application for delivery. Determining the mode can further be based on a screen configuration of a device running the first application. The mode may also be changing from one type of application (like a website accessed via a browser) to another type of application, like a smartphone/tablet application. All of the preprocessing and so forth can occur in any transition such that the user is positioned in a state within the destination that enables them to either browse search results (say on Amazon where the input provided on google.com is used to present search results) or in a one-click state where the user can just click to purchase an item.

Advertisements

Figure 25:
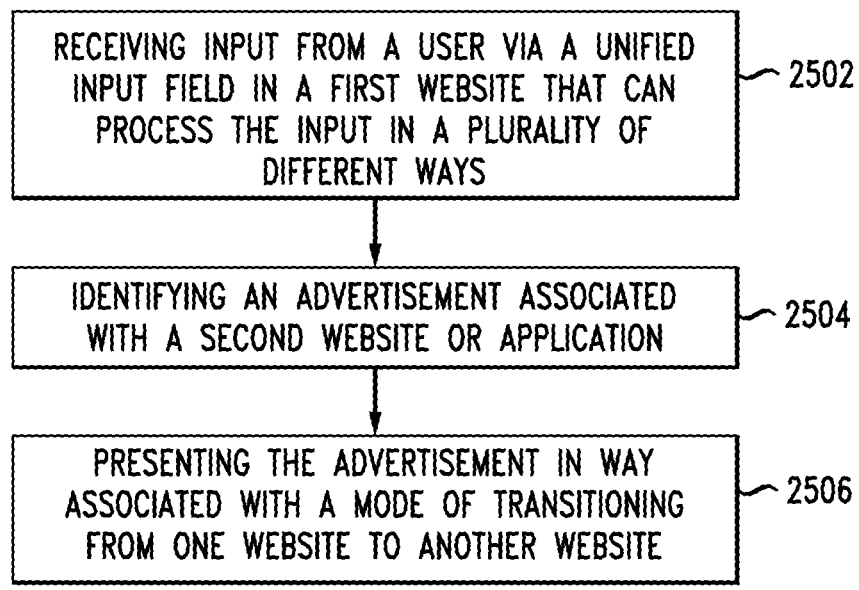
FIG. 25 illustrates a method embodiment for presenting advertisements.

FIG. 25 illustrates a method embodiment. This embodiment relates to how various advertisements can be presented in connection with the use of a unified input field disclosed herein. A method includes receiving input from a user via a unified input field in a first website that can process the input in a number of different ways (2502). The first website could also be a first application or first user interface. The method includes identifying an advertisement associated with a second website or application (2504) and presenting the advertisement in way associated with a mode of transitioning from one website (application) to another website (application). There are various ways of transitioning smoothly and the advertising can be tailored to the mode of transition. For example, the ad can be presented one of the following ways or associated with one of the following transitions: a tear within the first website that reveals at least a portion of the second website, in a manner associated with an extension menu identifying the second website and available for selection by the user, in a manner associated with a morphed search button that alternates its function based on an intent identified from the input, in a manner associated with an automatic transition from the first website to the second website without user direct navigation and in a manner associated with a negotiated version of the second website which places the second website into a one-click purchasing state for selection by the user (2506).

There are a number of different ways of transitioning from a first input field context or environment to another without the need of the user actively navigating to the destination environment. In this embodiment, since the system knows the intent of the user based on the analysis of the input data of the user, the system can use that intent and the knowledge of the destination site to present advertisements at some point during the transition.

For example, if the user is on google.com and enters "iPhone 5s 64 GB silver" the system may determine that the intent is to make a purchase. A tear could open up in the white space of the webpage revealing a portion of an amazon.com page in a purchase state where the user can just "one-click" and buy the iPhone and have it delivered. However, elsewhere on the white space, the system could present a Samsung device advertisement, which also could be positioned in a one-click state to tempt the user to purchase a different product or to explore a different product. Presenting the advertisement could be based on a price paid for the advertisement. A position within an extension menu of the second website or application of the advertisement could also be based on a negotiated price. In this case, when an extension menu is presented, a highest paid advertiser could be positioned closest to the input field. Presenting the advertisement in one of the ways identified can be chosen based on a negotiated price. The method can include transitioning the user from the first website (or application) to the second website (or application) based on an intent identified from the input and without manual user navigation.

Presenting Previews of Destination Websites in a Universal Search Interface

Figure 26:
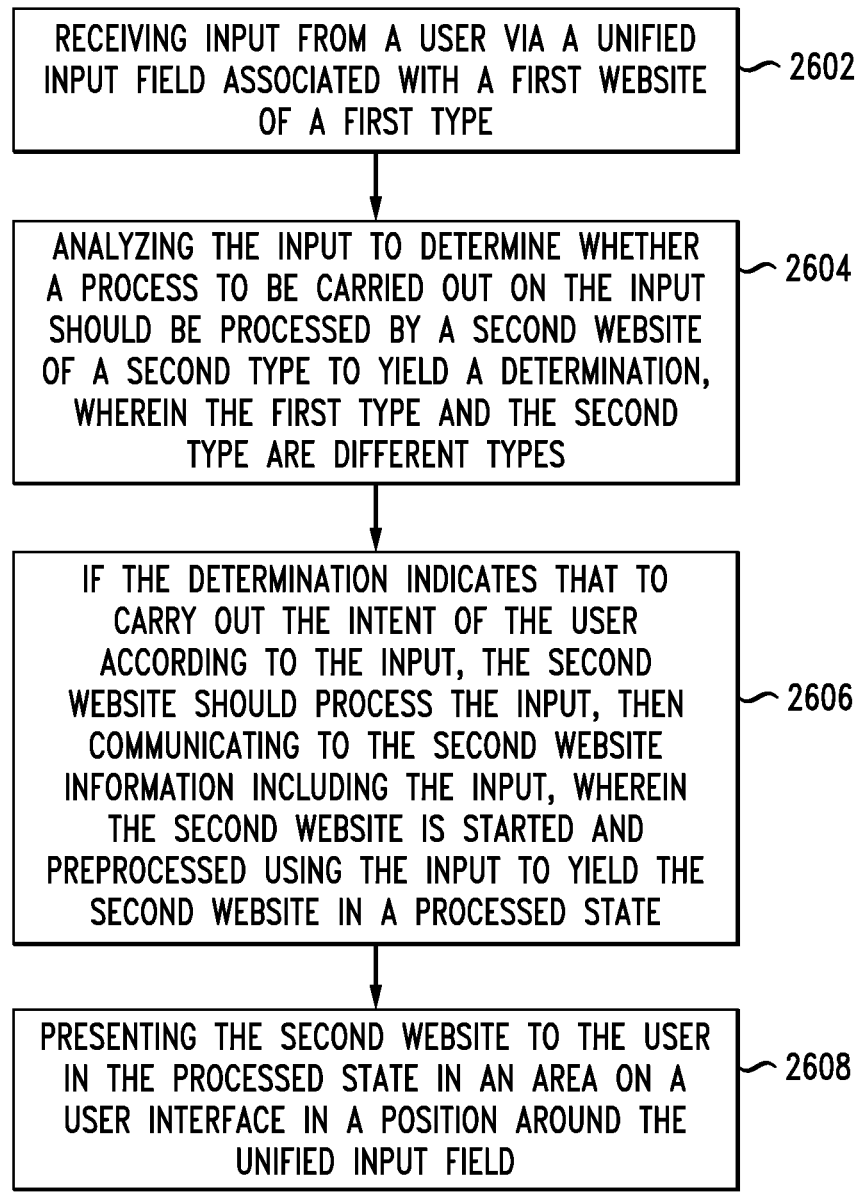
FIG. 26 illustrates a method embodiment for presenting miniature versions of destination websites.

FIG. 26 illustrates a method embodiment. This embodiment focuses on presenting one or more miniature versions of destination websites or modified versions of other websites as a result of processing the input of the unified input field. For example, presenting a small version of amazon.com featuring the product associated with the input and preprocessed such that the user can touch a "one-click" button and make a purchase. A method example includes receiving input from a user via a unified input field associated with a first website of a first type (2602) and analyzing the input to determine whether a process to be carried out on the input should be processed by a second website of a second type to yield a determination, wherein the first type and the second type are different types (2604). If the determination indicates that to carry out the intent of the user according to the input, the second website should process the input, then the method causes a processor to perform the operation of communicating to the second website information including the input, wherein the second website is started and preprocessed using the input to yield the second website in a processed state (2606). The processed state could be a search results state which is the equivalent of the user navigating to the other website and entering in the input and searching for products. The processed state can be a best and most likely resulting product that the user desires to buy, based on their input and other factors, in connection with a one-click option to purchase that product. The buy option, when interacted with by a user, can result in the system processing a payment via payment data stored with the first application and coordinating delivery of the item via a second application. The method includes presenting the second website to the user in the processed state in an area on a user interface in a position around the unified input field (2608).

Figure 27:
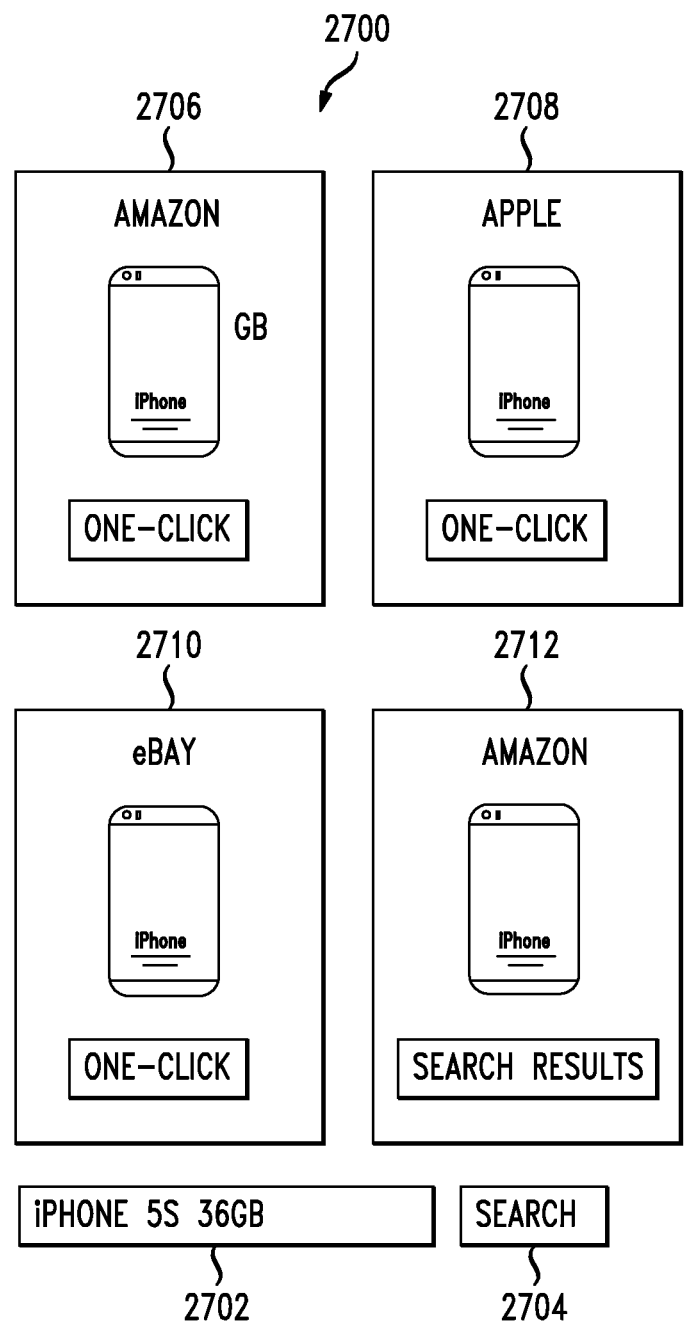
FIG. 27 illustrates a user interface with various destination sites in a preprocessed state.

The presenting can occur without any additional input from the user to navigate to the second website. In other words, the user just types in the input into the input field and the preprocessing of the other websites and presentation of those websites in one of a number of possible preprocessed states is performed automatically and without any navigation input from the user. The number of alternate websites presented in processed states could be also done based on the amount of disambiguation information needed. If the user only puts in "iPhone 5s" then many alternate preprocessed websites could be presented for 32 GB one-click purchase, gold 64 GB one-click purchase, etc. The user can see these various offerings and disambiguate by simply typing in disambiguation data such as "32" and "silver". The presentation then of the other website can automatically morph such that it narrows down the offerings to perhaps a one-click from Amazon and a one-click from Apple. FIG. 27 illustrates the interface 2700 with the search field 2702, search button 2704 and various alternate destination sites such as one from Amazon 2706 for a one-click purchase, and Apple website 2708 for a one-click purchase. An eBay website 2710 with a one-click purchase or a one-click bid button and an Amazon search results offering 2712 wherein if the user click that button, the URL switches to amazon.com and is preprocessed as though the user had entered in "iPhone 5s 32 GB" and hit "search" directly on Amazon.com. As can be appreciated, preprocessing the input in this way reduces the number of interactions necessary by the user to navigate from a search website like Google.com to a product purchasing website like Amazon.com and then provide input to search and make a purchase.

The processed state can include one of a state wherein the user could perform a single click which would cause a purchase and delivery of an item associated with the input or wherein the user could perform a single click and view search results on the second website as though the user had navigated to the second website and entered in the input for a search. The method can include identifying a third website that could process the input and presenting the third website in the area on the user interface in a second position around the unified input field. FIG. 27 illustrates this approach. The second website and the third website can be in different states as is result 2712 compared to results 2706. Further, a position of the second website and the third website relative to the unified input field can be dependent on which of the second website and the third website has a most likely intent based on the input. Clicking on the "one-click" or the "search" button in one of the destination sites not only causes the purchase and delivery but also causes an automatic transitioning from the first website URL (such as www.google.com) to the chosen website URL (such as www.amazon.com). In other words, clicking on the "one-click" button (or other function button such as "search results") not only processes the purchase and delivery but also causes the transition to the other website. If a user had navigated to www.amazon.com initially and searched until they click on the one-click purchasing button, then they would see at www.amazon.com the notice "Thank you for your 1-click purchase, it is being processed." At that stage, the user could go to their account and change or cancel the order, track the order etc. The point here is that by clicking on the one-click button, presented in feature 2706 of FIG. 27, which is presented on the URL www.google.com, the system automatically causes the URL to change to www.amazon.com in such a processed states as to present that message: "Thank you for your 1-click purchase, it is being processed." At that stage, there is no difference in essence between the initial navigation to www.amazon.com and this automatic transition from www.google.com. Of course, the navigation can be from any website or application to any other website or application. The transition can also include separating the processing of payment and managing delivery. For example, google.com could handle payment for an item but coordinate with www.merchant.com for delivery of the order.

Figure 28:
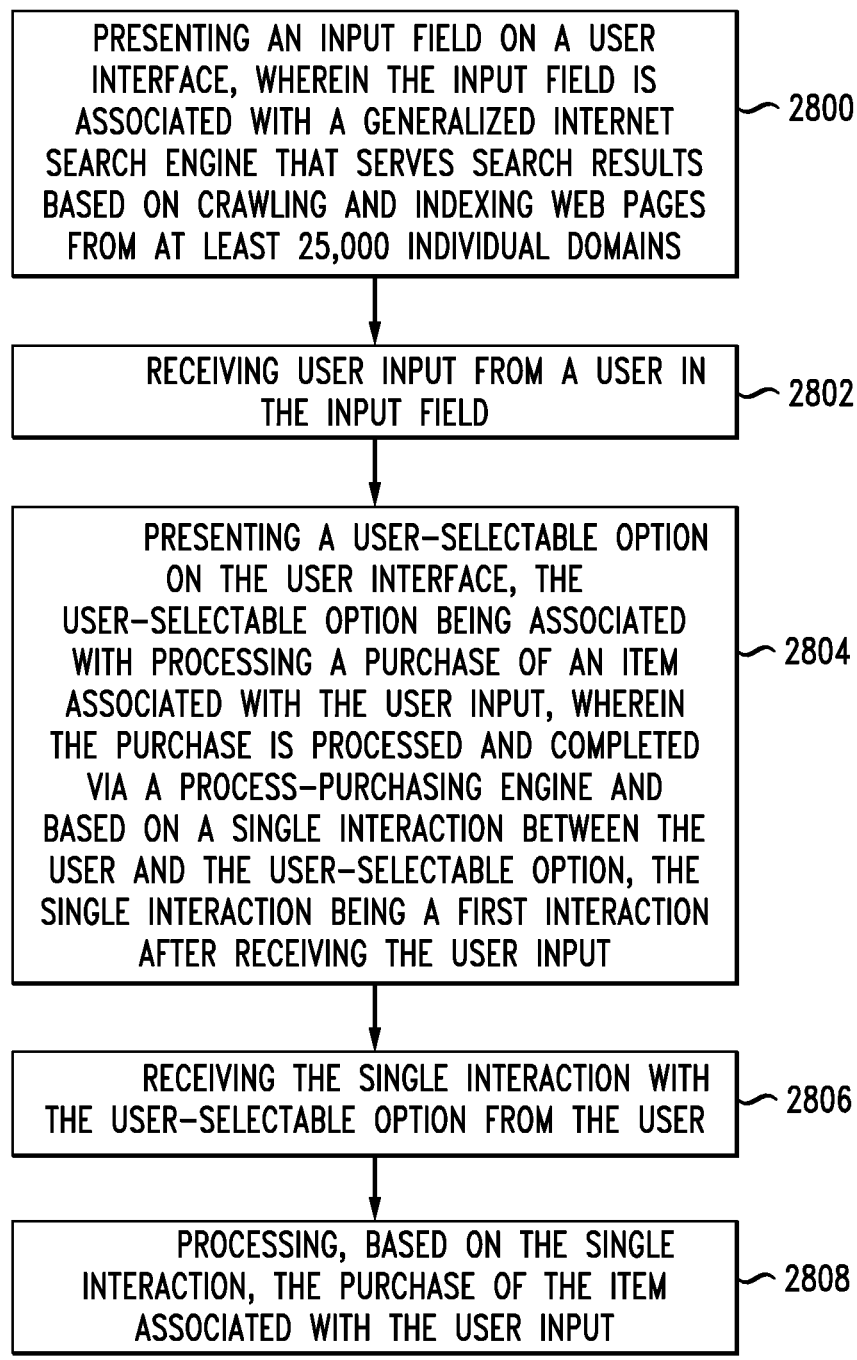
FIG. 28 illustrates another method embodiment.

FIG. 28 illustrates another embodiment related to the processing disclosed herein. A system can present an input field on a user interface, wherein the input field is associated with a generalized Internet search engine that serves search results based on crawling and indexing web pages from at least 25,000 individual domains (2800). This number of course can change but it is meant to distinguish between an Internet search via Google or Yahoo versus a search on a signal website like searching www.newyorktimes.com. The method includes receiving user input from a user in the input field (2802) and presenting a user-selectable option on the user interface, the user-selectable option being associated with processing a purchase of an item associated with the user input, wherein the purchase is processed and completed via a process-purchasing engine (which can be operated by the input field entity) and based on a single interaction between the user and the user-selectable option, the single interaction being a first interaction after receiving the user input (2804). The delivery of the item can be accomplished via a separate merchant from the input field entity.

As an example, a user enters in the iPhone 6 into the search field, thus the "user input" is "iPhone 6". The user types in the text and hits "enter" or "search". The system processes that input and constructs an interaction for the user that enables the user, without performing any further interactions after hitting "enter" (i.e., no need to navigate to another website or jump to another application), such that the next interaction can be (does not have to be but is structured such that it can be) a user interaction with the user-selectable option to buy (purchase and/or deliver) the iPhone 6. Thus, the method includes receiving the single interaction with the user-selectable option from the user (2806) and processing, based on the single interaction, the purchase of the item associated with the user input (2808). Of course the processing can include purchase and delivery. Other options available to the user of course could include tailoring the purchasing process to be a delivery to a relative or friend (someone other than the purchaser), or to pay in a different way that is preferable set on the user profile. Much like purchasing processes and capabilities with outlets like Amazon.com, the present disclosure encompasses all such functionality at this stage as well. For example, the interaction with the buy option can result in the first entity associated with the unified input field processing a payment of an item and coordinating with a separate merchant for filling or finalizing the order by delivering the item to the buyer. The first entity would them handle making a payment to the merchant.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
   presenting an input field on a user interface of a generalized search entity, wherein the generalized search entity uses a generalized search engine that indexes and searches both merchant websites and non-merchant websites;
   receiving input from a user in the input field to yield user input, wherein the user input is textual;
   correlating the user input against a product database of products for sale from a merchant to yield a correlation;
   determining, via a processor, that the user input is associated with one of a search intent and a purchase intent to yield a determination, wherein the determination of whether the user input indicates the purchase intent or the search intent is made based on the correlation;
   when the determination indicates the search intent:
      presenting a search result comprising a non-merchant website;
      receiving a search interaction associated with the non-merchant website; and
      transitioning the user to the non-merchant website;
   when the determination indicates the purchase intent:
      receiving, via an application programming interface, data associated with an item from a merchant site, the item being selected based on the user input;
      presenting a purchase-related search result comprising a buy now option associated with the item;
      receiving a user interaction associated with the buy now option; and
      based on the user interaction, processing a payment for the item via stored payment information for the user at the generalized search entity to yield purchasing data; and
      communicating the purchasing data via the application programming interface to the merchant site, whereby the merchant site can manage delivery of the item.

2. The method of claim 1, further comprising:
   requesting search data via the application programming interface based on the user input.

3. The method of claim 1, wherein the generalized search entity and the merchant site are different entities.

4. The method of claim 1, wherein the generalized search entity and the merchant site each have a different ways of interacting with users.

5. The method of claim 1, wherein communicating the purchasing data via the application programming interface to the merchant site enables communication between two applications on a device.

6. The method of claim 1, wherein the generalized search entity is accessed via an application on one of a mobile device and a computing device.

7. A system comprising:
   a processor; and
   a computer-readable storage medium storing instructions which, when executed by the processor, cause the processor to perform operations comprising:
      presenting an input field on a user interface of a generalized search entity, wherein the generalized search entity uses a generalized search engine that indexes and searches both merchant websites and non-merchant websites;
      receiving input from a user in the input field to yield user input, wherein the user input is textual;
      correlating the user input against a product database of products for sale from a merchant to yield a correlation;
      determining, via a processor, and without further user interaction after the user input, that the user input is associated with one of a search intent and a purchase intent to yield a determination, wherein the determination of whether the user input indicates the purchase intent or search intent is made based on the correlation;
      when the determination indicates the search intent:
         presenting a search result comprising a non-merchant website;
         receiving a search interaction associated with the non-merchant website; and
         transitioning the user to the non-merchant website;
      when the determination indicates the purchase intent:
         receiving, via an application programming interface, data associated with an item from a merchant site, the item being selected based on the user input;
         presenting a purchase-related search result comprising a buy now option associated with the item;
         receiving a user interaction associated with the buy now option; and based on the user interaction, processing a payment for the item via stored payment information for the user at the generalized search entity to yield purchasing data; and communicating the purchasing data via the application programming interface to the merchant site, whereby the merchant site can manage delivery of the item.

8. The system of claim 7, wherein the instructions cause the processor to perform a further operation comprising:

requesting search data via the application programming interface based on the user input.

9. The system of claim 7, wherein the generalized search entity and the merchant site are different entities.

10. The system of claim 7, wherein the generalized search entity and the merchant site each have a different means of interacting with users.

11. The system of claim 7, wherein communicating the purchasing data via the application programming interface to the merchant site enables communication between two applications on a device.

12. The system of claim 7, wherein the generalized search engine is accessed via an application on one of a mobile device and a computing device.

13. A non-transitory computer-readable storage medium storing instructions which, when executed by a processor, cause the processor to perform operations comprising:

presenting an input field on a user interface of a generalized search entity, wherein the generalized search entity processes data using a generalized search engine that indexes and searches both merchant websites and non-merchant websites;

receiving input from a user in the input field to yield user input, wherein the user input is textual;

correlating the user input against a product database of products for sale from a merchant to yield a correlation;

determining, via a processor, that the user input is associated with one of a search intent and a purchase intent to yield a determination, wherein the determination of whether the user input indicates the purchase intent or the search intent is made based on the correlation;

when the determination indicates the search intent:

presenting a search result comprising a non-merchant website;

receiving a search interaction associated with the non-merchant website; and transitioning the user to the non-merchant website;

when the determination indicates the purchase intent:

receiving, via an application programming interface, data associated with an item from a merchant site, the item being selected based on the user input;

presenting a purchase-related search result comprising a buy now option associated with the item;

receiving a user interaction associated with the buy now option; and based on the user interaction, processing a payment for the item via stored payment information for the user at the generalized search entity to yield purchasing data; and communicating the purchasing data via the application programming interface to the merchant site, whereby the merchant site can manage delivery of the item.

14. The non-transitory computer-readable storage medium of claim 13, the instructions causing the processor to perform further operations comprising:

requesting search data via the application programming interface based on the user input.

15. The non-transitory computer-readable storage medium of claim 13, wherein the generalized search entity and the merchant site are different entities.

16. The non-transitory computer-readable storage medium of claim 13, wherein the generalized search entity and the merchant site each have a different means of interacting with users.

17. The non-transitory computer-readable storage medium of claim 13, wherein communicating the purchasing data via the application programming interface to the merchant site enables communication between two applications on a device.

18. The non-transitory computer-readable storage medium of claim 13, wherein the generalized search engine is accessed via an application on one of a mobile device and a computing device.

* * * * *